United States Patent Office 2,873,275
Patented Feb. 10, 1959

2,873,275

PROCESS OF REACTING ACID DERIVATIVES WITH SPECIFIED ORGANOMAGNESIUM CHLORIDES

Hugh E. Ramsden, Metuchen, N. J., assignor to Metal & Thermit Corporation, New York, N. Y., a corporation of New Jersey No Drawing. Application November 28, 1955
Serial No. 549,543

6 Claims. (Cl. 260—295)

This invention relates to a process of reacting organomagnesium chlorides with acid derivatives including esters, diesters, acyl halides, nitriles, cyanogen halides, and orthoesters and to products made by this process. This application is a continuation-in-part of application S. N. 520,141, filed July 5, 1955, now abandoned.

The organomagnesium chloride reagents employed in practicing this invention may be described as $$RMgCl \cdot nQ$$

where R is an aryl group, a vinyl group or a heterocyclic group, as more particularly defined below, $n$ is an indeterminate number from 1 to 3, and Q has the significance hereinafter defined. These organomagnesium chloride reagents are made by reacting the corresponding RCl with magnesium in the presence of compound Q as reaction medium. In accordance with this invention, these organomagnesium chloride reagents are reacted with acid derivatives including esters and diesters, acyl halides, nitriles and orthoesters to yield, after further reaction with water or dilute acid, substituted alcohols, ketones, aldehydes, or acetals. These are useful as intermediates for the manufacture of plasticizers, as insecticides, as perfumes and in other products or the alcohols may be converted to olefins useful as polymerization monomers.

Compound Q is a substituted or unsubstituted heterocyclic compound (having 5 or 6 atoms in the ring) containing one oxygen atom in the ring structure; the other ring atoms being carbon with the exception that one nitrogen atom may be substituted for any carbon atom other than those carbon atoms adjacent to the oxygen. The heterocyclic compounds may contain a single unsaturated bond, as in dihydropyran. Compounds within this definition include tetrahydrofuran, tetrahydropyran, 2-methyltetrahydrofuran, 2-ethoxytetrahydropyran, tetrahydrofurfuryl ethyl ether, dihydropyran, dibenzofuran and N-methylmorpholine. Permissible substitutions being groups which are not reactive with organomagnesium chlorides, or with any of the other components and products of the reaction mixtures of the present process, and includes substituted and unsubstituted alkyl, aryl, alkoxy and aryloxy groups (all allowable substitutes being those unreactive to other components of the reaction mixture as specified hereinbefore). Where nitrogen replaces a carbon atom, hydrogen on the nitrogen atom must be substituted with a group unreactive to the reactants or reaction products. A further requirement for Q is that the oxygen must be available for electron donation, i. e., the free p-electrons present on the oxygen should be available for coordination with the organomagnesium chloride. Any large blocking groups in the 2 and 5(6) position may restrict the availability of these electrons. Another way these electrons may be restricted in their availability is by p-pi resonance, as for example in furan, which is not operative. One double bond giving p-pi resonance, as in dihydropyran (which is operative) allows reactivity since the oxygen still has free p-electrons. Expressed in another fashion, the oxygen of the heterocyclic ring structure must be such that electrons of the oxygen atom are available for coordination and complex formation with magnesium. Since Q also apparently functions as a solvent, a Q which has a high melting point may still function in this invention, but if it is used as solvent, obviously the high melting point (e. g. above 90° C.) causes great difficulty in carrying out the reaction. Any liquid Q of any structure whatsoever (with the limitations specified hereinbefore) will work.

The compound Q, employed to promote reaction and to form a complex with the vinyl-heterocyclic or aryl magnesium chloride may be a simple 5 or 6 member heterocyclic compound containing one oxygen in the ring and having the requisite characteristics set forth above, e. g., tetrahydrofuran, tetrahydropyran, dihydropyran, etc. It may also be a 5 or 6 member heterocyclic compound containing one oxygen in the ring and further substituted by monovalent groups and having said characteristics, e. g., 2-methyltetrahydrofuran, 2-ethoxytetrahydrofuran, tetrahydrofurfuryl ethyl ether, N-methyl morpholine, etc. Furthermore, the compound Q may be a 5 or 6 member heterocyclic compound having one oxygen atom in the ring and substituted by polyvalent radicals to form fused ring compounds, providing that the compound has the necessary characteristics set forth above in the definition of compound Q, e. g., dibenzofuran, etc.

It is an object of the present invention to provide a process for reacting said organomagnesium chlorides with acid derivatives including esters and diesters, acyl halides, nitriles, and orthoesters to yield useful products. It is also an object of this invention to provide several new products useful in industry.

The reactions are carried out in the cyclic tetra- or pentamethylene oxide compound, Q, as reaction medium, preferably at a temperature between room temperature and the reflux temperature. However, the temperature is not critical and may be even lower than room temperature. Inert hydrocarbon solvents may also be used as the reaction medium in place of compound Q. When the reaction between the above-mentioned acid derivatives and the organomagnesium chloride reagent is finished, cold water or dilute acid is added carefully and the resulting substituted alcohol, aldehyde, ketone or acetal is recovered by distillation or otherwise. The sequence of reactions in the case of esters is illustrated by the following general equations:

(1) $\quad RMgCl \cdot nQ + R'CO_2R'' \rightarrow RR'CO + nQ$
(2) $\quad RMgCl \cdot nQ + RR'CO \rightarrow R_2R'COMgCl + nQ$
(3) $\quad R_2R'COMgCl + H_2O \rightarrow R_2R'COH + MgClOH$ For acyl halides, the general reaction may be written:

(1A) $\quad RMgCl \cdot nQ + R'COX \rightarrow RR'CO + MgClX + nQ$

RR'CO then reacts according to Equations 2 and 3.
For nitriles, the general reactions are:

(1B) $\quad RMgCl \cdot nQ + R'CN \rightarrow RR'C=N-MgCl + nQ$ (2B) $\quad RR'C=N-MgCl + H_2O \xrightarrow{+H^+} RR'CO + H_2NMgCl$ For orthoesters, the general reaction is:

(1C) $\quad RMgCl \cdot nQ + R''C(OR')_3 \rightarrow RR''C(OR')_2 + nQ$

X is a halogen and R, R' and R'' are organic radicals which will be more specifically defined in what follows and R'' may be H.

ARYLMAGNESIUM CHLORIDE REAGENTS (A) *Reactions with esters*

The reactions of arylmagnesium chloride reagents with esters in accordance with this invention may be illustrated by the following over-all equations, which include the hydrolysis step (Equation 3 above) though it must be understood that this step is carried out separately.

(4) $RMgCl \cdot nQ + HCO_2R'' + H_2O \rightarrow [RCHO] \rightarrow R_2CHOH + nQ$ (5) $RMgCl \cdot nQ + CH_3CO_2R'' + H_2O \rightarrow [RCOCH_3] \rightarrow R_2COHCH_3 + nQ$ (6) $RMgCl \cdot nQ + R'CO_2R'' + H_2O \rightarrow [RCOR'] \rightarrow R_2COHR' + nQ$ wherein n is a small whole number, R' and R'' may be alkyl, aryl, alkenyl, and aralkyl, and wherein R is defined as:

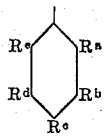

wherein $R^a$, $R^b$, $R^c$, $R^d$ and $R^e$ may be the same or different substituents as long as they do not react with the arylmagnesium chloride reagent. They may be hydrogen; fluorine, chlorine; alkyl, such as methyl, ethyl, etc.; alkenyl, such as vinyl, allyl, propenyl, etc.; aryl, such as phenyl, tolyl, xylyl, xenyl, etc.; aralkyl, such as benzyl, phenylethyl, cinnamyl, methylbenzyl, etc.; heterocyclic, such as thienyl, thenyl, furyl, etc.; alkoxy, such as methoxy, ethoxy; allyloxy, etc.; aryloxy, such as phenoxy, tolyloxy, xenyloxy, etc.; and dialkylamino, such as dimethylamino, diethylamino, etc. groups.

Arylmagnesium chlorides react with di, tri-, and polyesters to form intermediates which may be isolated (shown in brackets) as well as to form end products, according to the following reactions:

(7) $RMgCl \cdot nQR'CO_2R''CO_2R' + H_2O \rightarrow [RCOR''CO_2R']$ (7a) 

(7b) 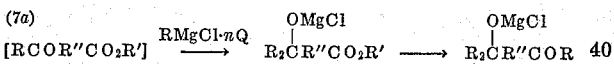

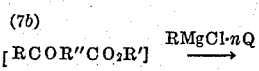

(7c) 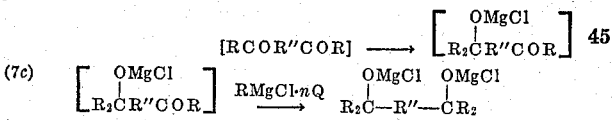

(7d) 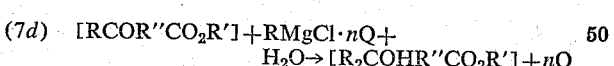

(7e) 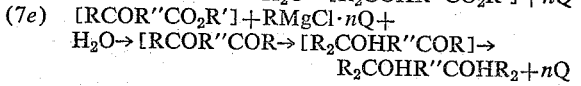

wherein R and R' are the same as in Reactions 4 through 6, and R'' is a divalent radical inert to organomagnesium chloride reagents.

Alcohols may be dehydrated to yield desirable olefins, or diolefins in the case of diesters products. Tri- and polyesters function similarly to give their accompanying olefins, the requirement being presence of hydrogens on carbons α to the OH group.

Chlorophenyl and substituted chlorophenylmagnesium chlorides react with monoesters, such as those of monobasic carboxylic acids according to Reactions 4 through 6, wherein R' and R'' are monovalent organic radicals free of groups reactive to RMgCl, and R is defined in this case as:

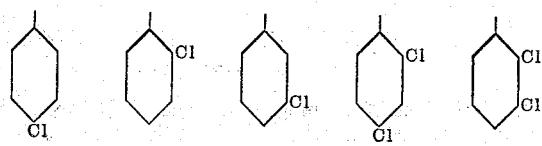

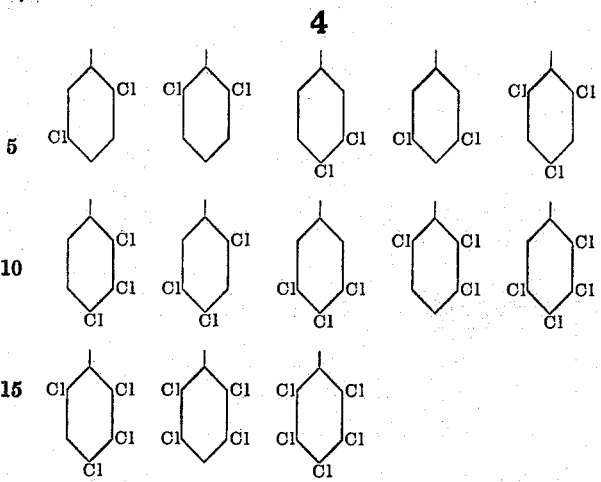

In the above radicals any positions not containing chlorine may be filled with fluorine or any organic monovalent group such as alkyl, alkenyl, aryl, dialkylamino, alkoxy, aryloxy and alkenyloxy groups in place of the hydrogen. In addition, divalent groups such as alkylidene dioxy groups may join to adjacent open positions. The substituents may contain functional groups if these are not reactive to the arylmagnesium chloride reagent.

Where $R_2COHR'$, the product of Reaction 6, contains the group $R_2COH-CH=R_2COHR'$ may be dehydrated to yield further products: $R_2C=C=$.

Chlorophenyl and substituted chlorophenyl magnesium chloride reagents further react with di- and polyesters such as those of di- and polycarboxylic organic acids, according to Reactions 7 through 7e. In this case, R' and R'' are the same as defined for Reactions 7 through 7e. R in this case is the chlorophenyl or substituted chlorophenyl as defined above for monoester reactions.

Wherever the group $R_2COHCH=$ occurs in the chlorophenyl reactions, dehydration may yield desirable compounds, as for example:

(8)

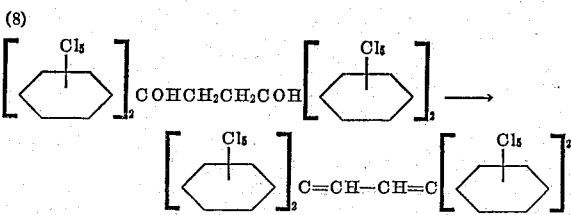

Xenylmagnesium chlorides will react with esters of monocarboxylic acids:

(4a) $RMgCl \cdot nQ + HCO_2R' \rightarrow [RCHO] \rightarrow R_2CHOH$ (5a) $RMgCl \cdot nQ + CH_3COOR' \rightarrow RCOCH_3 \rightarrow R_2COHCH_3 \rightarrow R_2C=CH_2$ (9) $RMgCl \cdot nQ + R'O_2CCH_2R'' \rightarrow RCOCH_2R'' \rightarrow R_2COHCH_2R'' \rightarrow R_2C=CHR''$

(10) $RMgCl \cdot nQ + R'O_2CCHR''R''' \rightarrow RCOCHR''R''' \rightarrow R_2COHCHR''R''' \rightarrow R_2C=CR''R'''$

(11) $RMgCl \cdot nQ + R'O_2CCR''R'''R'''' \rightarrow RCOCR''R'''R'''' \rightarrow R_2C(OH)CR''R'''R''''$ (12)

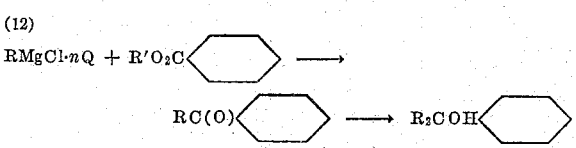

wherein R', R'', R''' and R'''' are monovalent organic radicals inert to RMgCl.

R may be defined in the above reactions as a xenyl radical, substituted or unsubstituted. The raw materials for preparing the RMgCl by the polymethylene oxide process might also contain some chlorinated terphenyls. Thus, R may be:

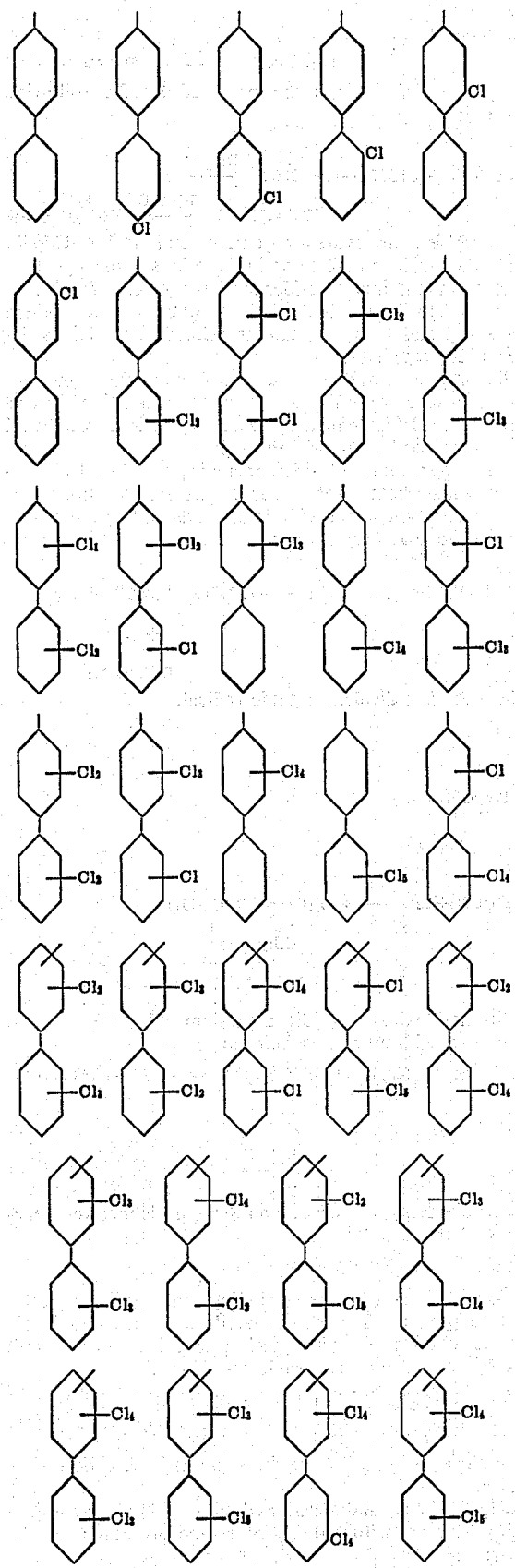

The bond to the magnesium may be ortho, meta or para. Other groups may be present instead of ring hydrogen, including alkyl, alkenyl, aryl, alkaryl, aralkyl, fluorine, alkoxy, alkenoxy, aryloxy, dialkylamino, etc. groups.

Xenylmagnesium chlorides react also with esters of polycarboxylic acids according to Reactions 7–7e, R' and R'' being as defined for these reactions and R being as defined for Reactions 4a and 5a.

Bifunctional arylene di(magnesium chloride) reagents may also be used with monoesters to form mono-addition products as well as polymers, according to the following reactions:

(14)
$$R(MgCl)_2 \cdot nQ + R'O_2CH \longrightarrow$$
$$O=CHR(-CH(OH)R-)_mMgCl \xrightarrow{oxidation}$$
$$HO_2CR(-C(O)R-)_mH + nQ$$

(15) $R(MgCl)_2 \cdot nQ + R'O_2CR'' \rightarrow O=C(R'')R[COH(R'')R-]_m-MgCl + nQ$

(16)
$$R(MgCl)_2 \cdot nQ + R'O_2CCH_3 \longrightarrow$$
$$O=C(CH_3)R[COH(CH_3)R]_m-MgCl + nQ \xrightarrow{heat}$$
$$O=C(CH_3)R[C=(CH_2)R-]_mH$$

(17)
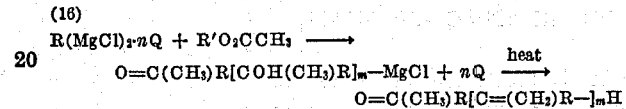

(18)
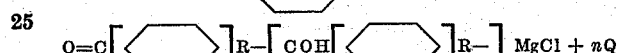

With polyesters:

(19) $R(MgCl)_2 + R'O_2CR'''CO_2R' \rightarrow$
polymeric reaction products

In the foregoing bifunctional arylene di(magnesium chloride) reactions, R' and R'' are monovalent radicals, R''' is a divalent radical, R', R'' and R''' being inert to $R(MgCl)_2$, n and m are small whole numbers, and $R(MgCl)_2$ may be in general:

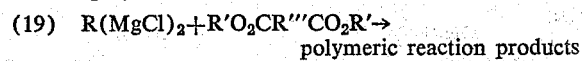

where the hydrogens on the ring may be replaced by any group not reactive to RMgCl, such as chlorine, fluorine, R'$_2$N—, R'O—, R', etc., and where R' is a monovalent organic radical. Two neighboring R' radicals may be cyclicized.

$R(MgCl)_2$ may also be:

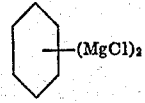

$(MgCl)_2$ where hydrogen may be replaced as above;

$(MgCl)_2$ where hydrogen may be replaced as above;

$(MgCl)_2$ where hydrogen may be replaced as above;

$(MgCl)_2$ where hydrogen may be replaced as above;

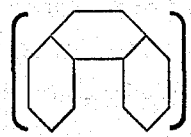

(MgCl)$_2$ where hydrogen may be replaced as above; or R may be any other bivalent group where the bonds from carbon to magnesium are those of aromatic carbon to magnesium, where hydrogen may be replaced as described above.

Those alcohols prepared by the above bifunctional arylene di(magnesium chloride) process which have $$RCOH—CH=$$

groups present, may also be dehydrated to yield desirable compounds according to Reaction 8.

(B) Reactions with acyl halides

Arylmagnesium chloride reagents react with acyl halides by the following overall equations which include the hydrolysis step (Equations 3); it is to be understood that the latter reaction is carried out separately:

(20) $RMgCl \cdot nQ + R'COX + H_2O \rightarrow$
$$[RR'CO] \rightarrow R_2R'COH + nQ$$

wherein [RR'CO] may be isolated.

(21) $RMgCl \cdot nQ + ClC(O)CH_3 + H_2O \rightarrow$
$$[RC(O)CH_3] \rightarrow R_2COHCH_3 + nQ$$

(21a) $R_2COHCH_3 \xrightarrow{dehydrate} R_2C=CH_2$ (22)

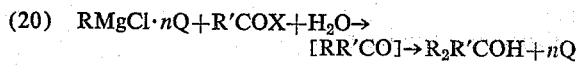

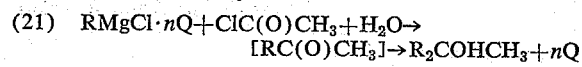

(23) $RMgCl \cdot nQ + ClC(O)R''C(O)Cl \rightarrow$
$$RC(O)R''C(O)Cl + nQ$$

(23a)

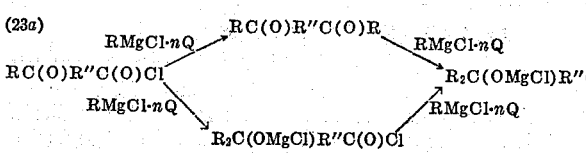

$$R_2C(OMgCl)R''(OMgCl)CR_2 + H_2O \xrightarrow{H^+} R_2C(OH)R''C(OH)R_2 + nQ$$

$$\text{dehydrate} \downarrow$$

$$R_2C=CHR''—CH=CR_2$$

wherein R' is a monovalent hydrocarbon radical such as alkyl, aryl, alkenyl or aralkyl, or such a hydrocarbon radical carrying functional groups inert to $RMgCl \cdot nQ$, R'' is a divalent aliphatic or aromatic hydrocarbon radical or such a hydrocarbon radical carrying functional groups inert to $RMgCl \cdot nQ$, X is chlorine, bromine or iodine, and R is defined as in Reactions 4 through 6.

Chlorophenyl and substituted chlorophenylmagnesium chlorides react with acyl halides according to Reactions 20–23a. In this case, R is the chlorophenyl radical as previously defined for Reactions 4 through 6.

Xenylmagnesium chlorides similarly react with acyl halides according to Reactions 20–23a. R in this case is the xenyl radical as previously defined for Reactions 4a, 5a and 9 through 12.

Bifunctional arylene di(magnesium chloride) reagents also react with acyl halides, according to the following:

(24) $R(MgCl)_2 \cdot nQ + R'COX \rightarrow R[C(O)R']_2 +$
$$H_2O \rightarrow —R—(—C(OH)R'R—C(OH)R'R—)_n + nQ$$

wherein R' and R are the same as defined for Reactions 14 through 18. They react also with esters of polycarboxylic acids to yield complex products.

C. Reactions with nitriles

Aryl magnesium chloride complexes of this invention may react with nitriles to form ketones after hydrolysis. The reactions are as follows:

(25)
$$RMgCl \cdot nQ + R'CN \longrightarrow$$
$$RR'C=NMgCl \xrightarrow{H^+, H_2O} RR'C=O + nX$$

Symmetrical ketones are prepared by the following scheme:

(26)
$$RMgCl \cdot nQ + ClCN \longrightarrow RCN \xrightarrow{RMgCl}$$
$$R_2C=NMgCl \xrightarrow{H^+, H_2O} R_2C=O + nQ$$

where R' is a monovalent organic radical inert to RMgCl, and wherein R is defined as in Reactions 4 through 6.

Xenylmagnesium chlorides similarly react with nitriles, according to Reactions 25 and 26, wherein R' is defined as above, and R is the same as defined in Reactions 4a, 5a and 9 through 12.

Chlorophenyl and substituted chlorophenyl magnesium chlorides react with nitriles according to Reactions 25 and 26, wherein R' is defined as above, and R is chlorophenyl as defined for Reactions 4 through 6.

Arylmagnesium chlorides, including xenyl and chlorophenylmagnesium chlorides, as defined for Reactions 4–6, 4a, 5a and 9–12, react with compounds having more than one nitrile group as follows:

(26a)
$$2RMgCl \cdot nQ + R''(CN)_2 \longrightarrow R''(RCNMgCl)_2 + nQ$$
$$H^+ \downarrow H_2O$$
$$R''(RCO)_2$$

where R'' is a divalent organic radical.

Bifunctional arylene di(magnesium chloride) reagents also react with nitriles as follows:

(27) $R(MgCl)_2 \cdot nQ + R'CN + H_2O \rightarrow R(C(O)R')_2 + nQ$

(28)
$$R(MgCl)_2 \cdot nQ + ClCN \longrightarrow$$
$$R(CN)_2 \xrightarrow{R(MgCl)_2} —R—\begin{pmatrix}NMgCl & NMgCl\\ \| & \|\\ C—R—C—R—\end{pmatrix}$$

etc. (polymers) wherein R' and R are as defined for Reactions 14 through 19.

(D) Reaction with orthoesters

Aldehydes and ketones including those ordinarily difficult to prepare, may be prepared as acetals and ketals by the reaction of arylmagnesium chloride reagents with orthoformates and orthoesters as follows:

(29) $RMgCl \cdot nQ + CH(OR')_3 \rightarrow RCH(OR')_2 + nQ$

(30) $RMgCl \cdot nQ + R''C(OR')_3 \rightarrow RR''C(OR')_2 + nQ$ wherein R, R' and R'' are the same as in Reactions 4, 5 and 6.

Chlorophenyl and substituted chlorophenyl magnesium chlorides react with orthoformates and orthoesters as follows:

(31) $RMgCl \cdot nQ + CH(—OC_2H_5)_3 \rightarrow$
$$RCH(OC_2H_5)_2 + nQ$$

and generally according to Reaction 30, wherein R, R' and R" are the same as defined for Reactions 4, 5, and 6 using chlorophenyl in (A) of Arylmagnesium Chloride Reagents.

Xenylmagnesium chlorides react with orthoformates and orthoesters according to Reactions 29 and 30. In this case R, R' and R" are the same as in Reactions 4a, 5a and 9 through 12.

Bifunctional arylene di(magnesium chloride) reagents react with orthoformates and orthoesters as follows:

(32) $R(MgCl)_2 \cdot nQ + CH(OR')_3 \rightarrow R[CH(OR')_2]_2 + nQ$

(33) $R(MgCl)_2 \cdot nQ + R''C(OR')_3 \rightarrow R[R''C(OR'_2)_2]_2 + nQ$ wherein $R(MgCl)_2$, R' and R" are the same as in Reactions 14 through 19.

HETEROCYCLICMAGNESIUM CHLORIDE REAGENTS

(A) Reactions with esters

Heterocyclicmagnesium chloride reagents, $RMgCl \cdot nQ$, as defined below, react with esters of monobasic carboxylic acids generally according to the following reactions:

(34)
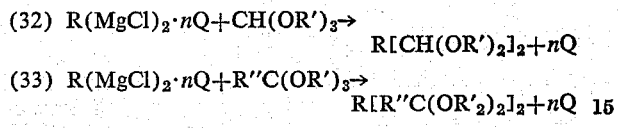

(35)

$RMgCl \cdot nQ + R'CO_2R'' \longrightarrow [RR'CO[ \begin{matrix} R_2CO + nQ \\ \longrightarrow \\ R_2R'COH + nQ \end{matrix}$

(36)
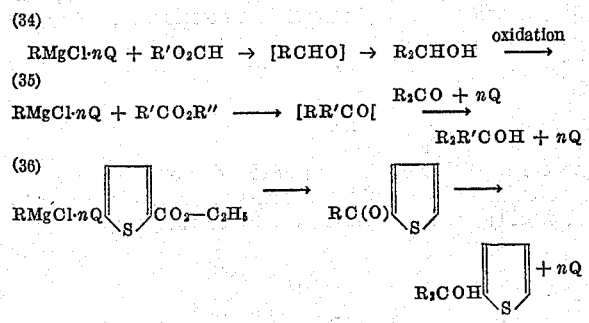

in which n is a small whole number, Q is as previously defined, and R is a radical which includes in its structure an oxygen, sulfur or tertiary nitrogen heterocycle, its bond to magnesium being through a carbon of an aromatic or pseudoaromatic ring.

Among the types of heterocyclic groups, R, which may be employed in reactions such as Nos. 34–36 are those shown in the following structural formulas in which a free bond indicates the point of attachment of the MgCl group except that when two free bonds are shown in one structure they represent alternative points of attachment. In these structures any or all hydrogens in the molecules may be replaced by fluorine, chlorine, alkyl, alkenyl, aryl, alkoxy, aryloxy or other groups not reactive to RMgCl. Two adjacent substituents may be linked or cyclized to form further condensed rings.

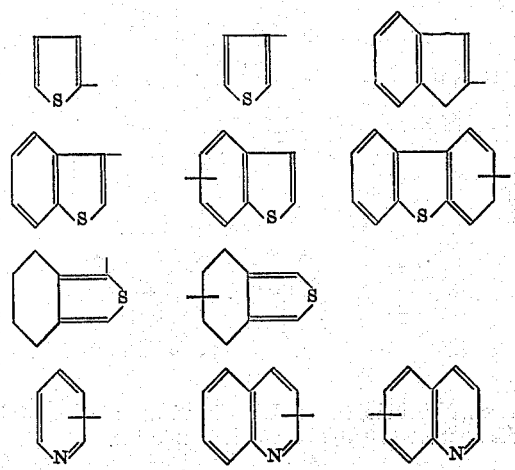

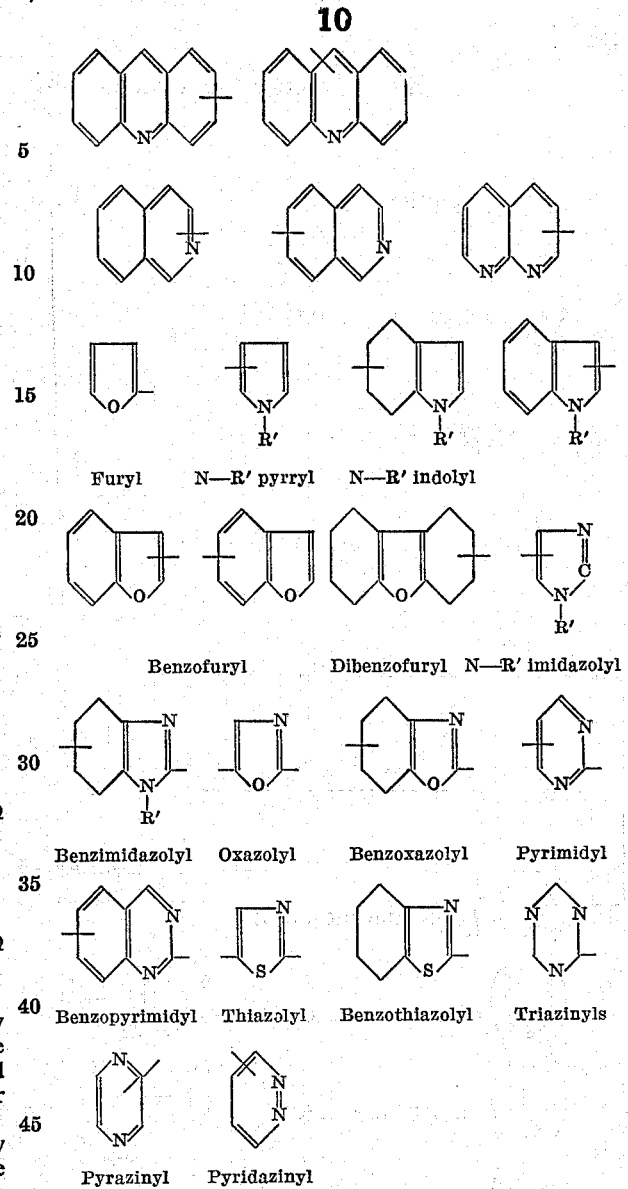

Furyl   N—R' pyrryl   N—R' indolyl

Benzofuryl   Dibenzofuryl   N—R' imidazolyl

Benzimidazolyl   Oxazolyl   Benzoxazolyl   Pyrimidyl

Benzopyrimidyl   Thiazolyl   Benzothiazolyl   Triazinyls

Pyrazinyl   Pyridazinyl

The reactions with esters of polycarboxylic acids are the following:

(37) $RMgCl \cdot nQ + R'O_2CR''CO_2R' \rightarrow [RC(O)R''CO_2R'] + nQ$ (37a)
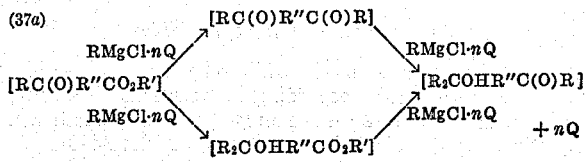

(37b)
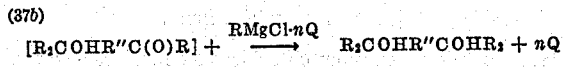

Specifically:

(38)
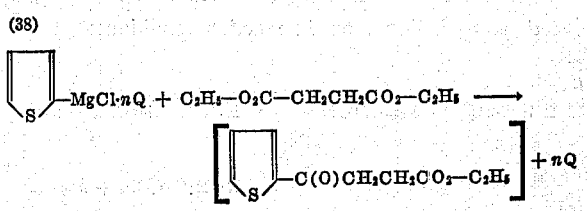

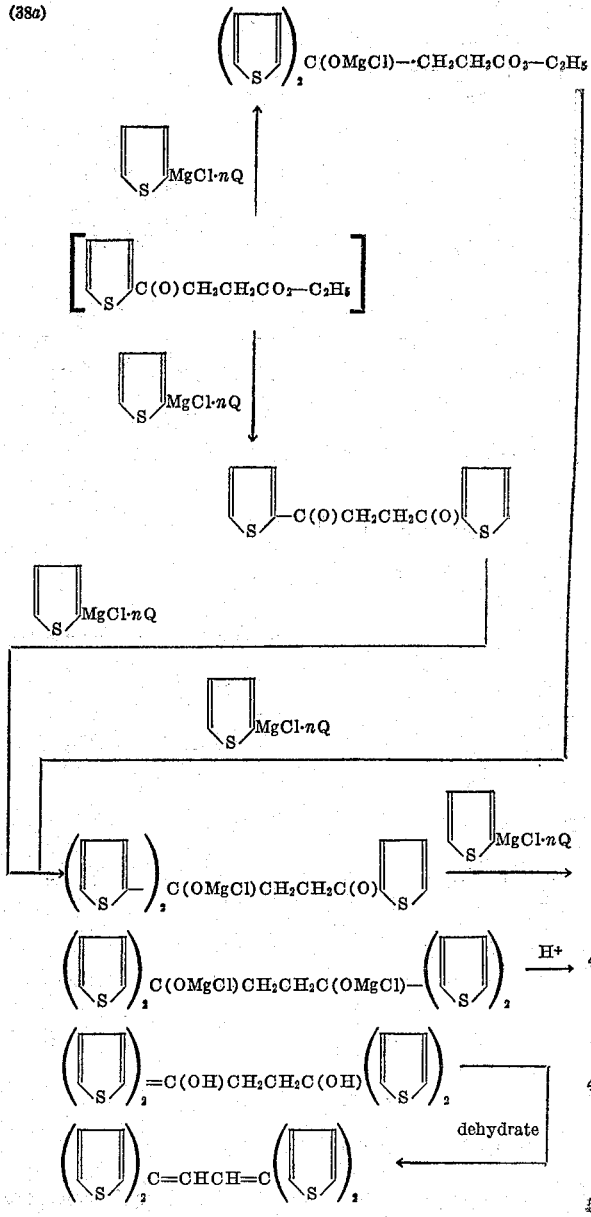

wherein R' is a monovalent organic radical, and R'' is a divalent organic radical, both R' and R'' being inert to RMgCl. R is a heterocyclic radical as described for Reactions 34 through 36.

(B) *Reactions with acyl halides*

Heterocyclic magnesium chloride reagents RMgCl·nQ, react with acyl halides according to Reactions 20–23a in which R' and R'' have the meanings given them for those equations while R is defined as for Reactions 34–36.

(C) *Reaction with nitriles*

Heterocyclic magnesium chloride reagents, RMgCl·nQ, as defined above, react with nitriles as in Reactions 25 and 26. An interesting special case is the reaction with acrylonitrile which proceeds by either of the following reactions depending upon the reaction conditions:

(39)
$$RMgCl·nQ + CH_2=CHCN \longrightarrow RC(O)CH=CH_2 + nQ$$
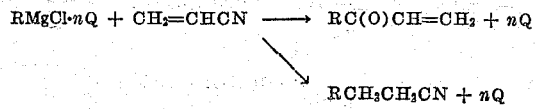
$$RCH_2CH_2CN + nQ$$

(D) *Reaction with orthoesters*

Heterocyclic magnesium chloride reagents, RMgCl·nQ, as defined above, react with orthoformates and orthoesters according to Reactions 29 and 30.

VINYL MAGNESIUM CHLORIDE REAGENTS

In this application, the term "vinyl" radical refers to the vinyl group or to substituted vinyl groups. Thus, a vinyl chloride has the general formula:

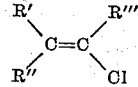

where R', R'' and R''' may be the same or different and may be hydrogen or any hydrocarbon group, aliphatic or aromatic; they may also be hydrocarbon groups with functional group substituents provided that the latter are inert to magnesium and to vinyl magnesium chloride; R' may cyclize with R'' or R''' as, for example, in the compound $$\begin{array}{c} CH_2-CH=C-Cl \\ | \quad\quad\quad | \\ CH_2-CH_2-CH_2 \end{array}$$

furthermore, R''' may also be chlorine, in which case the magnesium may react with one or both chlorines.

When the formula RMgCl·nQ is used in this application to refer to a vinyl magnesium chloride, then R represents the group

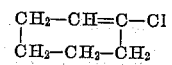

where R', R'' and R''' are as defined above.

Similarly, in a vinyl di(magnesium chloride) reagent, R(MgCl)$_2$·nQ, R represents the bivalent group

(A) *Reaction with esters*

Vinyl magnesium chloride reagents, RMgCl·nQ, as defined above react with monoesters in accordance with Reactions 1–3 and 4–6 and with polyesters in accordance with Reactions 7–7e, in which R' and R'' are defined as they were for these equations.

(B) *Reactions with acyl halides*

Vinyl magnesium chloride reagents, RMgCl·nQ, as defined above, react with acyl halides forming vinyl ketones or divinyl alcohols which may be dehydrated provided α hydrogens are present to yield triolefins as follows (shown for vinyl-magnesium chloride complex):

(46)

(47) $CH_2=CHMgCl·nQ + R'R''R'''C-C(O)Cl \rightarrow$
$\quad\quad R'R''R'''C-C(O)-CH=CH_2 \rightarrow etc. + nQ$

(48)
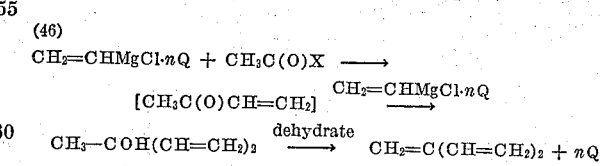
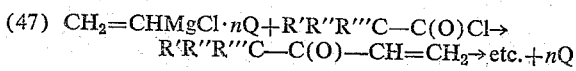
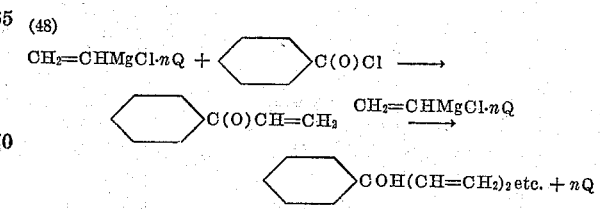

wherein X is halogen and R', R'' and R''' are monovalent radicals inert to vinyl magnesium chloride.

(C) Reactions with nitriles

Vinyl magnesium chloride reagents, $RMgCl \cdot nQ$, as defined above, react with nitriles to form vinyl ketones as follows:

(49)
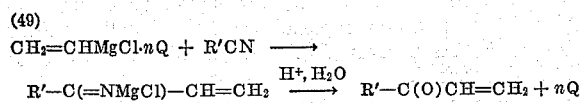

(50)
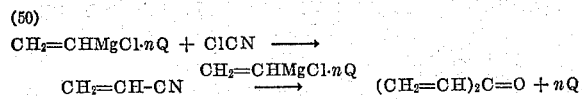

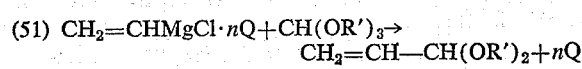

wherein R' is a monovalent organic radical inert to vinyl magnesium chloride.

(D) Reactions with orthoesters

Vinyl magnesium chloride reagents, $RMgCl \cdot nQ$, as defined above, also react with orthoformates as follows:

(51) $CH_2=CHMgCl \cdot nQ + CH(OR')_3 \rightarrow$
$CH_2=CH-CH(OR')_2 + nQ$ wherein R' is defined as a monovalent organic radical inert to vinyl magnesium chloride.

(E) Reactions of vinyl di(magnesium chloride) reagents

Vinyl di(magnesium chloride) reagents, $R(MgCl)_2 \cdot nQ$, as defined above react with monoesters, polyesters, acyl halides, nitriles and orthoesters by reactions analogous to those described for bifunctional arylene di(magnesium chloride) reagents, namely Reactions 14–19, 24, 27, 28, 32 and 33.

The following examples are further illustrative of the present invention. It is to be understood, however, that the invention is not restricted to the specific embodiments described herein in detail.

EXAMPLE 1.—PREPARATION OF 3,5-DIVINYL-3,5-DIHYDROXYHEPTADIENE-1,6

Two moles of vinylmagnesium chloride-tetrahydrofuran complex in tetrahydrofuran solution (700 ml.) were introduced into a 2 liter, 3 neck flask equipped with a stainless steel stirrer, a chopping burette and a reflux condenser. Air was displaced from the apparatus by dry nitrogen. 72.2 grams (0.45 mole) of methyl malonate were added through the dropping funnel over a twenty minute period, the reaction mixture being stirred meanwhile. The temperature was held between 20° and 30° C. during the addition by means of an ice bath. Reaction continued slowly thereafter. A color test made the next morning indicated that much of vinylmagnesium chloride reagent was still present. After another day, however, the test was only weakly positive and the batch was then cooled to 10° C. and hydrolysed by dilute hydrochloric acid. The batch now formed two clear liquid layers which were separated in a separatory funnel. The aqueous portion was extracted with ethylether, the extracts being added to the organic portion. Ethyl ether, and tetrahydrofuran were stripped from the organic portion. From the residue remaining, 36 grams 3,5-divinyl-3,5-dihydroxyheptadiene-1,6 were recovered as a fraction boiling at 90–93° C. at 15 mm. pressure. Its refractive index was 1.4145 @ 27°.

EXAMPLE 2.—PREPARATION OF 3,6-DIVINYL-3,6-DIHYDROXYOCTADIENE-1,7

A solution of 1.88 moles of vinylmagnesium chloride complex in tetrahydrofuran was allowed to react with 0.45 mole of ethyl succinate by the procedure of Example 1. The product was hydrolysed by dilute hydrochloric acid. The organic layer thus formed was stripped of solvent to yield a crude 3,6-divinyl-3,6-dihydroxyoctadiene-1,7. When purification of the latter was attempted by vacuum distillation, it polymerized rapidly.

EXAMPLE 3

Crude o-phenylene bis(divinyl carbinol) was made by the reaction of 1.95 moles of vinylmagnesium chloride complex in tetrahydrofuran with 0.45 mole of ethyl phthalate using the procedure of Example 2. In an attempt to purify the product by vacuum distillation, it polymerized.

EXAMPLE 4.—PREPARATION OF ACROLEIN

A solution of 1 mole of vinylmagnesium chloride-tetrahydrofuran complex is allowed to react with 4 moles of methyl formate according to the conditions of Example 1, with the exception that the vinylmagnesium compound is added to the ester. The Grignard complex is hydrolyzed by dilute sulfuric acid and the product isolated from the organic layer. This yields acrolein, B. P. 52.5°, $n_D^{20}$ 1.3998.

EXAMPLE 5.—PREPARATION OF 1,4-PENTADIEN-3-OL

Two moles of vinylmagnesium chloride-tetrahydrofuran complex in 700 ml. of tetrahydrofuran is placed in a 2 l. flask as described in Example 1, and 1 mole of methyl formate added dropwise over a 20 minute period. The temperature of the addition is kept between 20–30° C. After refluxing 1 hour, dilute sulfuric acid is added to effect hydrolysis, and the two layers separated. The aqueous layer is extracted with ether and the ether extracts added to the organic layer. Solvent is then removed and from the residue there is obtained 1,4-pentadien-3-ol.

EXAMPLE 6.—PREPARATION OF 3-METHYL-1,4-PENTADIEN-3-OL

The apparatus of Example 1 is used and 1 mole of ethyl acetate is added dropwise over a twenty minute period to a stirred solution of 2 moles of vinylmagnesium chloride-tetrahydrofuran complex in 700 ml. tetrahydrofuran. An ice bath is used to keep the temperature between 20 and 30° C. The reaction mixture is then brought to the boiling point and allowed to reflux for 1 hour. It is next cooled, hydrolyzed with dilute hydrochloric acid, the two layers separated and the water layer extracted with ether. The combined organic layer and ether extracts is stripped of solvent and the residue purified. This gives 3-methyl-1,4-pentadien-3-ol.

EXAMPLE 7.—PREPARATION OF 3-UNDECYL-1,4-PENTADIEN-3-OL 3-undecyl-1,4-pentadien-3-ol is prepared by the procedure of Example 5, using two moles of vinylmagnesium chloride-tetrahydrofuran complex and one mole of butyl laurate as the reactants.

EXAMPLE 8.—PREPARATION OF 3-VINYL-1,11-EICOSADIEN-3-OL

Two moles of vinylmagnesium chloride-tetrahydropyran complex react with 1 mole of methyl oleate under the conditions of Example 6 to yield 3-vinyl-1,11-eicosadien-3-ol.

EXAMPLE 9.—PREPARATION OF ETHYL 2-HYDROXY-2-VINYL-3-BUTENOATE

When 2 moles of vinylmagnesium chloride-methyltetrahydrofuran complex is allowed to react with 1 mole of diethyl oxalate according to Example 5, there results ethyl 2-hydroxy-2-vinyl-3-butenoate.

EXAMPLE 10.—PREPARATION OF 3,4-DIVINYL-3,4-DIHYDROXY-1,5-HEXADIENE

Four moles of vinylmagnesium chloride-tetrahydrofuran complex reacts with 1 mole of diethyl oxalate under the conditions of Example 6 to give 3,4-divinyl-3,4-dihydroxy-1,5-hexadiene.

EXAMPLE 11.—PREPARATION OF BUTYL 4-HYDROXY-4-VINYL-5-HEXENOATE

When 2 moles of vinylmagnesium chloride-tetrahydrofuran complex is caused to react with 1 mole of dibutyl succinate according to the process described in Example 5, the resulting product is butyl 4-hydroxy-4-vinyl-5-hexenoate.

EXAMPLE 12.—PREPARATION OF 3-6-DIVINYL-3,6-DIHYDROXY-1,7-OCTADIENE

Four moles of vinylmagnesium chloride-tetrahydrofuran complex reacts with 1 mole of dibutyl succinate by the procedure of Example 6 to yield 3,6-divinyl-3,6-dihydroxy-1,7-octadiene.

EXAMPLE 12a.—PREPARATION OF 3,6-DIVINYL-1,3,5,7-OCTATETRAENE

The compound of Example 12 is dehydrated by refluxing it in glacial acetic acid with a crystal of iodine. The product is 3,6-divinyl-1,3,5,7-octatetraene.

EXAMPLE 13.—PREPARATION OF METHYL 6,6-DIVINYL-6-HYDROXYCAPROATE

Dimethyl adipate, 1 mole, and vinylmagnesium chloridetetrahydrofuran complex, 2 moles, react together by the procedure of Example 5 to form methyl 6,6-divinyl-6-hydroxycaproate.

EXAMPLE 14.—PREPARATION OF 3,8-DIVINYL-3,8-DIHYDROXY-1,9-DECADIENE

Four moles of vinylmagnesium chloride-tetrahydrofuran complex and 1 mole of dimethyl adipate are allowed to react under the conditions of Example 6. The resulting product is 3,8-divinyl-3,8-dihydroxy-1,9-decadiene.

EXAMPLE 15.—PREPARATION OF ETHYL 10,10-DIVINYL-10-HYDROXYCAPRATE

When 2 moles of vinylmagnesium chloride-tetrahydrofuran complex and 1 mole of diethyl sebacate react by the procedure of Example 5, there is formed ethyl 10,10-divinyl-10-hydroxycaprate.

EXAMPLE 15a.—PREPARATION OF ETHYL 10,10-DIVINYL-9-DECENOATE

Ethyl 10,10-divinyl-10-hydrocaprate is dehydrated by refluxing it in benzene with a trace of p-toluenesulfonic acid. The resulting product is ethyl 10,10-divinyl-9-decenoate.

EXAMPLE 16.—PREPARATION OF 3,12-DIVINYL-3,12-DIHYDROXY-1,13-TETRADECADIENE

Four moles of vinylmagnesium chloride-tetrahydrofuran complex reacts with 1 mole of diethyl sebacate under the conditions of Example 6 to yield 3,12-divinyl-3,12-dihydroxy-1,13-tetradecadiene.

EXAMPLE 16a.—PREPARATION OF 3,12-DIVINYL-1,3,11,13-TETRADECATETRAENE

Dehydration of 3,12-divinyl-3,12-dihydroxy-1,13-tetradecadiene by the method of Example 12a gives 3,12-divinyl-1,3,11,13-tetradecatetraene.

EXAMPLE 17.—PREPARATION OF ETHYL 3,4,4-TRIVINYL-4-HYDROXYBUTYRATE

Three moles of vinylmagnesium chloride-tetrahydrofuran complex add to 1 mole of diethyl maleate under the conditions of Example 5 to give ethyl 3,4,4-trivinyl-4-hydroxybutyrate.

EXAMPLE 18.—PREPARATION OF ETHYL p-(DIVINYLHYDROXYMETHYL) BENZOATE

The reaction of 2 moles of vinylmagnesium chloridetetrahydrofuran complex with 1 mole of diethyl terephthalate by the method of Example 6 results in the formation of ethyl p-(divinylhydroxymethyl) benzoate.

EXAMPLE 19.—PREPARATION OF p-PHENYLENE BIS(DIVINYLCARBINOL)

p-Phenylene bis(divinylcarbinol) is made by the reaction of 4 moles of vinylmagnesium chloride-tetrahydrofuran complex with 1 mole of diethyl terephthalate, using the procedure of Example 5.

EXAMPLE 20.—PREPARATION OF DIVINYLPHENYLCARBINOL

When 2 moles of vinylmagnesium chloride-tetrahydrofuran complex is allowed to react with 1 mole of methyl benzoate according to the conditions of Example 6, there is obtained divinylphenylcarbinol.

EXAMPLE 21.—PREPARATION OF DIVINYL(p-METHOXYPHENYL)CARBINOL

The reaction between 2 moles of vinylmagnesium chloridetetrahydrofuran complex and 1 mole of methyl anisate by the process of Example 5 leads to divinyl(p-methoxyphenyl)carbinol.

EXAMPLE 22.—PREPARATION OF DIVINYL (α-FURYL)-CARBINOL

The conditions of Example 5, using 2 moles of vinylmagnesium chloride-tetrahydrofuran complex and one mole of methyl furoate as reactants are followed. The product isolated is divinyl (α-furyl)carbinol.

EXAMPLE 23.—PREPARATION OF DIVINYL-(3-PYRIDYL)CARBINOL

Two moles of vinylmagnesium chloride-tetrahydrofuran complex reacts with 1 mole of methyl nicotinate by the process described in Example 6 to give divinyl(3-pyridyl)carbinol.

EXAMPLE 24.—PREPARATION OF DIVINYL(2,4-DICHLOROPHENOXYMETHYL)CARBINOL

Two moles of vinylmagnesium chloride-tetrahydrofuran complex reacts with 1 mole of butyl 2,4-dichlorophenoxyacetate under the conditions of Example 5 to yield divinyl(2,4-dichlorophenoxymethyl)carbinol.

EXAMPLE 25.—PREPARATION OF METHYL 4-VINYL-4-HYDROXYVALERATE

Equimolar quantities of vinylmagnesium chloride-tetrahydrofuran complex and methyl levulinate are allowed to react according to Example 6 and there is isolated methyl 4-vinyl-4-hydroxyvalerate.

EXAMPLE 25a.—PREPARATION OF METHYL 4-VINYL-3-PENTENOATE

Dehydration of methyl 4-vinyl-4-hydroxyvalerate by refluxing it in glacial acetic acid with a crystal of iodine leads to methyl 4-vinyl-3-pentenoate.

EXAMPLE 26.—PREPARATION OF 3,6-DIVINYL-3,6-DIHYDROXY-1-HEPTENE

When 3 moles of vinylmagnesium chloride-tetrahydrofuran complex reacts with 1 mole of methyl levulinate according to Example 5, there is obtained 3,6-divinyl-3,6-dihydroxy-1-heptene.

EXAMPLE 26a.—PREPARATION OF 3,6-DIVINYL-1,3,5-HEPTATRIENE

The compound from Example 26 is dehydrated by the method of Example 12a and there results 3,6-divinyl-1,3,5-heptatriene.

EXAMPLE 27.—PREPARATION OF METHYL 4-PENTENOATE

One mole of vinylmagnesium chloride-tetrahydrofuran complex reacts with 1 mole of methyl acrylate by the process of Example 6, and gives by 1,4-addition methyl 4-pentenoate.

EXAMPLE 28.—PREPARATION OF 3-METHYL-1,4-PENTADIENE-3-OL

Two moles of vinylmagnesium chloride-tetrahydrofuran complex is allowed to react with 1 mole of acetyl chloride under the conditions of Example 5 to yield 3-methyl-1,4-pentadiene-3-ol.

EXAMPLE 28a.—PREPARATION OF 2-VINYL-1,3-BUTADIENE

3 - methyl - 1,4 - pentadiene - 3 - ol is dehydrated by the method of Example 15a and gives 2-vinyl-1,3-butadiene.

EXAMPLE 29.—PREPARATION OF METHYL VINYL KETONE

One mole of vinylmagnesium chloride in 3 moles of tetrahydrofuran is placed in a flask as described in Example 1 and a suspension of 0.5 mole anhydrous fused zinc chloride in 2 moles of tetrahydrofuran is added with stirring. The reaction mixture is allowed to reflux 2 hours, then cooled to room temperature. To this is added, over a period of twenty minutes, one mole of acetyl chloride. An ice-bath is necessary to maintain a temperature of 20–30° C. After the addition is complete, the mixture is allowed to reflux two hours, then cooled to room temperature and hydrolyzed with dilute hydrochloric acid. The organic layer is separated, solvent removed and from the residue is isolated methyl vinyl ketone.

EXAMPLE 30.—PREPARATION OF 3-VINYL-3-HYDROXY-1,3-HEXADIENE

Two moles of vinylmagnesium chloride-tetrahydrofuran complex reacts with 1 mole of butyryl chloride by the method of Example 5 to give 3-vinyl-3-hydroxy-1,3-hexadiene.

EXAMPLE 31.—PREPARATION OF VINYL PROPYL KETONE

The procedure of Example 29 is followed using one mole of vinylmagnesium chloride, 0.5 mole zinc chloride, and 1 mole of butyryl chloride as reactants. In this way there is obtained vinyl propyl ketone.

EXAMPLE 32.—PREPARATION OF DIVINYL-PHENYLCARBINOL

The reaction of 2 moles of vinylmagnesium chloride-tetrahydrofuran complex with 1 mole of benzoyl chloride by the procedure of Example 5 yields divinylphenylcarbinol.

EXAMPLE 33.—PREPARATION OF PHENYL VINYL KETONE

One mole of vinylmagnesium chloride-tetrahydrofuran complex and 0.5 mole of zinc chloride is allowed to react with 1 mole of benzoyl chloride under the conditions of Example 29 to give phenyl vinyl ketone.

EXAMPLE 34.—PREPARATION OF 3,4-DIVINYL-3,4-DIHYDROXY-1,5-HEXADIENE

One mole of oxalyl chloride is added to 4 moles of vinylmagnesium chloride-tetrahydrofuran complex in the manner described in Example 6. From the residue there is isolated 3,4-divinyl-3,4-dihydroxy-1,5-hexadiene.

EXAMPLE 35.—PREPARATION OF METHYLENE-PYRUVYL CHLORIDE

Equimolar quantities of vinylmagnesium chloride-tetrahydrofuran complex and oxalyl chloride are allowed to react in the presence of zinc chloride by the process described in Example 29. No dilute acid is added, however. Instead, the solid is filtered off and the filtrate distilled, giving methylenepyruvyl chloride.

EXAMPLE 36.—PREPARATION OF DIACRYLYL

When 2 moles of vinylmagnesium chloride-tetrahydrofuran complex and 1 mole of zinc chloride is allowed to react with 1 mole of oxalyl chloride, there is obtained diacrylyl.

EXAMPLE 37.—PREPARATION OF ETHYL β-ACRYLYLPROPIONATE

Equimolar quantities of vinylmagnesium chloride-tetrahydrofuran complex and the acid chloride of monoethyl succinate are allowed to react in the manner described in Example 29 (0.5 mole of zinc chloride present) to yield ethyl β-acrylylpropionate.

EXAMPLE 38.—PREPARATION OF 3,6-DIHYDROXY-1,7-OCTADIENE

One mole of the acid chloride of monoethyl succinate is added to 4 moles of vinylmagnesium chloride-tetrahydrofuran complex according to Example 6 and the resulting product is 3,6-dihydroxy-1,7-octadiene.

EXAMPLE 39.—PREPARATION OF 8-ACRYLYLVALERYL CHLORIDE

One mole of vinylmagnesium chloride-tetrahydrofuran complex and 0.5 mole of zinc chloride is allowed to react with 1 mole of adipoyldichloride in the manner described in Example 29 to give 8-acrylylvaleryl chloride.

EXAMPLE 40.—PREPARATION OF 1,4-DIACRYLYL-BUTANE

When 2 moles of vinylmagnesium chloride, 1 mole of zinc chloride and 1 mole of adipoyldichloride are caused to react under the conditions of Example 29, there is obtained 1,4-diacrylylbutane.

EXAMPLE 41.—PREPARATION OF 3,8-DIVINYL-3,8-DIHYDROXY-1,9-DECADIENE

When 4 moles of vinylmagnesium chloride-tetrahydrofuran complex is allowed to react with 1 mole of adipoyldichloride according to Example 5, there is obtained 3,8-divinyl-3,8-dihydroxy-1,9-decadiene.

EXAMPLE 41a.—PREPARATION OF 3,8-DIVINYL-1,3,7,9-DECATETRAENE

The compound of Example 41 is dehydrated under the conditions of Example 15a to give 3,8-divinyl-1,3,7,9-decatetraene.

EXAMPLE 42.—PREPARATION OF VINYL α-FURYL KETONE

The conditions of Example 29 are followed using as reactants 1 mole of vinylmagnesium chloride-tetrahydrofuran complex (0.5 mole zinc chloride present) and 1 mole of α-furoyl chloride. The resulting product is vinyl α-furyl ketone.

EXAMPLE 43.—PREPARATION OF DIVINYL-(α-FURYL)CARBINOL

Two moles of vinylmagnesium chloride-tetrahydrofuran complex react with 1 mole of α-furoyl chloride in the manner described in Example 6 to give divinyl (α-furyl) carbinol.

EXAMPLE 44.—PREPARATION OF METHYL VINYL KETONE

Equimolar quantities of vinylmagnesium chloride-tetrahydrofuran complex and acetonitrile react by the process of Example 5 and there is obtained methyl vinyl ketone.

EXAMPLE 45.—PREPARATION OF VINYL PROPYL KETONE

One mole of vinylmagnesium chloride-tetrahydrofuran complex is allowed to react with 1 mole of butyronitrile according to the procedure of Example 6 to yield vinyl propyl ketone.

EXAMPLE 46.—PREPARATION OF PHENYL VINYL KETONE

Phenyl vinyl ketone is prepared by the reaction of 1 mole each of vinylmagnesium chloride-tetrahydrofuran complex and benzonitrile under the conditions of Example 5.

EXAMPLE 47.—PREPARATION OF β-VINYL-PROPIONITRILE

One mole of vinylmagnesium chloride-tetrahydrofuran complex reacts with 1 mole of acrylonitrile according to the procedure of Example 6. 1,4-addition occurs primarily, giving β-vinylpropionitrile.

EXAMPLE 48.—PREPARATION OF 2-VINYL-SUCCINONITRILE

When 1 mole of vinylmagnesium chloride-tetrahydrofuran complex is added to 2 moles of fumaronitrile by the process of Example 6, the resulting product is 2-vinylsuccinonitrile.

EXAMPLE 49.—PREPARATION OF β-VINYL-β-ACRYLYLPROPIONITRILE

The reaction of 2 moles of vinylmagnesium chloride-tetrahydrofuran complex and 1 mole of fumaronitrile under the conditions of Example 5 leads to β-vinyl-β-acrylylpropionitrile.

EXAMPLE 50.—PREPARATION OF BENZALDEHYDE

One mole of phenylmagnesium chloride-tetrahydrofuran complex is added to a stirred solution of 4 moles of methyl formate in tetrahydrofuran in the manner described in Example 5. When the organic layer is worked up, there is obtained as the final product, benzaldehyde, B. P. 179° C.

EXAMPLE 51.—PREPARATION OF BENZHYDROL

When 1 mole of methyl formate is added to 2 moles of phenylmagnesium chloride-tetrahydrofuran complex under the conditions of Example 6, the resulting product is benzhydrol, M. P. 68–9° C.

EXAMPLE 52.—PREPARATION OF DIPHENYL-METHYLCARBINOL

The reaction of 2 moles of phenylmagnesium chloride and 1 mole of ethyl acetate according to the process of Example 5 yields diphenylmethylcarbinol.

EXAMPLE 53.—PREPARATION OF BUTYL 4,4-DI-PHENYL-4-HYDROXYBUTYRATE

Two moles of phenylmagnesium chloride-tetrahydrofuran complex is allowed to react with 1 mole of dibutyl succinate as described in Example 6, and there is obtained butyl 4,4-diphenyl-4-hydroxybutyrate.

EXAMPLE 54.—PREPARATION OF 1,1,6,6-TETRA-PHENYLHEXYLENE GLYCOL-1,6

When 4 moles of phenylmagnesium chloride-tetrahydrofuran complex and 1 mole of dimethyl adipate are caused to react according to Example 5, the product formed is 1,1,6,6-tetraphenylhexylene glycol-1,6.

EXAMPLE 55.—PREPARATION OF 1,1,10,10-TETRA-PHENYLDECYLENE GLYCOL-1,10

The reaction between 4 moles of phenylmagnesium chloride-tetrahydrofuran complex and 1 mole of diethyl sebacate is carried out by the process of Example 5, giving 1,1,10,10-tetraphenyldecylene glycol-1,10.

EXAMPLE 56.—PREPARATION OF TRIPHENYL-CARBINOL

Two moles of phenylmagnesium chloride-tetrahydrofuran complex and 1 mole of methyl benzoate react under the conditions of Example 6 to yield triphenylcarbinol, M. P. 162° C.

EXAMPLE 57.—PREPARATION OF DIPHENYL-(α-FURYL)CARBINOL

Diphenyl (α-furyl)carbinol is prepared by allowing 2 moles of phenylmagnesium chloride-tetrahydrofuran complex and 1 mole of methyl furoate to react in the manner described in Example 5.

EXAMPLE 58.—PREPARATION OF 1,1,4-TRIPHENYL-1,4-DIHYDROXYPENTANE

When 3 moles of phenylmagnesium chloride-tetrahydrofuran complex reacts with 1 mole of methyl levulinate according to Example 5, there is obtained 1,1,4-triphenyl-1,4-dihydroxypentane.

EXAMPLE 58a.—PREPARATION OF 1,1,4-TRIPHENYL-1,3-PENTADIENE

Dehydration of 1,1,4-triphenyl-1,4-dihydroxypentane by refluxing it in benzene with a small quantity of p-toluene-sulfonic acid yields 1,1,4-triphenyl-1,3-pentadiene.

EXAMPLE 59.—PREPARATION OF METHYL β-PHENYLPROPIONATE

One mole of phenylmagnesium chloride-tetrahydrofuran complex reacts with 1 mole of methyl acrylate by the process of Example 6 and gives by 1,4-addition methyl β-phenylpropionate.

EXAMPLE 60.—PREPARATION OF PHENYL METHYL KETONE

One mole of phenylmagnesium chloride-tetrahydrofuran complex and 0.5 mole of zinc chloride in 3 moles of tetrahydrofuran react according to Example 29 with 1 mole of acetyl chloride to yield phenyl methyl ketone.

EXAMPLE 61.—PREPARATION OF BENZOPHENONE

One mole of phenylmagnesium chloride-tetrahydrofuran complex and 0.5 mole of zinc chloride is allowed to react with 1 mole of benzoyl chloride under the conditions of Example 29 to give benzophenone, B. P. 306° C.

EXAMPLE 62.—PREPARATION OF DIBENZOYL

When 2 moles of phenylmagnesium chloride-tetrahydrofuran complex and 1 mole of zinc chloride is allowed to react with 1 mole of oxalyl chloride, by the process of Example 29 there is obtained dibenzoyl, benzil.

EXAMPLE 63.—PREPARATION OF ETHYL β-BENZOYLPROPIONATE

Equimolar quantities of phenylmagnesium chloride-tetrahydrofuran complex and the acid chloride of monoethyl succinate are allowed to react in the manner described in Example 29 (0.5 mole of zinc chloride present) to yield ethyl β-benzoylpropionate.

EXAMPLE 64.—PREPARATION OF ACETOPHENONE

One mole of phenylmagnesium chloride-tetrahydrofuran complex reacts with 1 mole of acetonitrile by the process of Example 5 and there is obtained acetophenone, B. P. 202° C.

EXAMPLE 65.—PREPARATION OF BENZOPHENONE

Benzophenone is prepared by the reaction of 1 mole each of phenylmagnesium chloride-tetrahydrofuran complex and benzonitrile under the conditions of Example 5. It has B. P. 306° C.

EXAMPLE 66.—PREPARATION OF p-CHLORO-BENZALDEHYDE

One mole of p-chlorophenylmagnesium chloride-tetrahydrofuran complex is added to a stirred solution of 4 moles of methyl formate in tetrahydrofuran in the manner described in Example 5. When the organic layer is worked up, there is obtained as the final product, p-chlorobenzaldehyde, B. P. 214° C., M. P. 47° C.

EXAMPLE 67.—PREPARATION OF DI(p-CHLORO-PHENYL)CARBINOL

When 1 mole of methyl formate is added to 2 moles of p-chlorophenylmagnesium chloride-tetrahydrofuran complex under the conditions of Example 6, the resulting product is di(p-chlorophenyl)carbinol.

EXAMPLE 68.—PREPARATION OF ETHYL DI(p-CHLOROPHENYL)HYDROXYACETATE

Two moles of p-chlorophenylmagnesium chloride-tetrahydrofuran complex is allowed to react with 1 mole of diethyl oxalate as described in Example 6, and there is obtained ethyl di(p-chlorophenyl)hydroxyacetate.

EXAMPLE 69.—PREPARATION OF 1,1,4,4-TETRA-(p-CHLOROPHENYL)-1,4-DIHYDROXYBUTANE

When 4 moles of p-chlorophenylmagnesium chloride-tetrahydrofuran complex and 1 mole of dibutyl succinate are caused to react according to Example 5, the product formed is 1,1,4,4-tetra(p-chlorophenyl)-1,4-dihydroxybutane.

EXAMPLE 70.—PREPARATION OF DI(p-CHLORO-PHENYL)METHYLCARBINOL

Two moles of p-chlorophenylmagnesium chloride-tetrahydrofuran complex is allowed to react with 1 mole of acetyl chloride under the conditions of Example 5 to yield di(p-chlorophenyl)methylcarbinol.

EXAMPLE 71.—PREPARATION OF DI(p-CHLORO-PHENYL)PHENYLCARBINOL

The reaction between 2 moles of p-chlorophenylmagnesium chloride-tetrahydrofuran complex and 1 mole of benzoyl chloride by the process of Example 6 gives di(p-chlorophenyl)phenylcarbinol.

EXAMPLE 72.—PREPARATION OF DI-p-CHLORO-BENZOYL

When 2 moles of p-chlorophenylmagnesium chloridetetrahydrofuran complex and 1 mole of zinc chloride is allowed to react with 1 mole of oxalyl chloride by the process of Example 29, there is obtained di-p-chlorobenzoyl.

EXAMPLE 73.—PREPARATION OF p-CHLOROPHENYL PROPYL KETONE

The reaction of equimolar quantities of p-chlorophenylmagnesium chloride-tetrahydrofuran complex and butyronitrile under the conditions of Example 6 gives p-chlorophenyl propyl ketone.

EXAMPLE 74.—PREPARATION OF o-TOLUALDEHYDE

One mole of o-tolylmagnesium chloride-tetrahydrofuran complex is added to a stirred solution of 4 moles of methyl formate in tetrahydrofuran in the manner described in Example 5. When the organic layer is purified, there is obtained as the final product, o-tolualdehyde, B. P. 194.

EXAMPLE 75.—PREPARATION OF DI(p-TOLYL)-METHYLCARBINOL

The reaction of 2 moles of p-tolylmagnesium chloride-tetrahydrofuran complex and 1 mole of ethyl acetate according to the procedure of Example 6 yields di(p-tolyl)methylcarbinol.

EXAMPLE 76.—PREPARATION OF ETHYL DI-(m-TOLYL)HYDROXYACETATE

Two moles of m-tolylmagnesium chloride-tetrahydrofuran complex is allowed to react with 1 mole of diethyl oxalate as described in Example 5, and there is obtained ethyl di(m-tolyl)-hydroxyacetate.

EXAMPLE 77.—PREPARATION OF METHYL 6,6-DI-(p-TOLYL)-6-HYDROXYCAPROATE

Dimethyl adipate, 1 mole, and p-tolylmagnesium chloride-tetrahydrofuran complex, 2 moles, react together by the procedure of Example 5 to form methyl 6,6-di(p-tolyl)-6-hydroxyacetate.

EXAMPLE 78.—PREPARATION OF DI(p-TOLYL) α-FURYLCARBINOL

Di(p-tolyl)α-furylcarbinol is prepared by allowing 2 moles of p-tolylmagnesium chloride-tetrahydrofuran and 1 mole of methyl furoate to react in the manner described in Example 6.

EXAMPLE 79.—PREPARATION OF DI(p-TOLYL)-PHENYLCARBINOL

The reaction between 2 moles of p-tolylmagnesium chloride-tetrahydrofuran complex and 1 mole of benzoyl chloride by the process of Example 5 gives di(p-tolyl)phenylcarbinol.

EXAMPLE 80.—PREPARATION OF p-TOLYL α-FURYL KETONE

One mole of p-tolylmagnesium chloride-tetrahydrofuran complex and 0.5 mole of zinc chloride are allowed to react with one mole of furoyl chloride under the conditions of Example 29. The resulting product is p-tolylα-furyl ketone.

EXAMPLE 81.—PREPARATION OF ANISALDEHYDE

One mole of anisylmagnesium chloride-tetrahydrofuran complex is added to a stirred solution of 4 moles of methyl formate in tetrahydrofuran in the manner described in Example 5. From the organic layer, there is obtained anisaldehyde, B. P. 247° C.

EXAMPLE 82.—PREPARATION OF DI(PHENETYL)-METHYLCARBINOL

The reaction of 2 moles of phenetylmagnesium chloride-tetrahydrofuran complex and 1 mole of ethyl acetate according to the process of Example 5 yields di(phenetyl)methylcarbinol.

EXAMPLE 83.—PREPARATION OF BUTYL 4,4-DIANISYL-4-HYDROXYBUTYRATE

Two moles of anisylmagnesium chloride-tetrahydrofuran complex is allowed to react with 1 mole of dibutyl succinate as described in Example 6, and there is isolated butyl 4,4-dianisyl-4-hydroxybutyrate.

EXAMPLE 84.—PREPARATION OF 1,1,4-TRI-(PHENETYL)-1,4-DIHYDROXYPENTANE

When 3 moles of phenetylmagnesium chloride-tetrahydrofuran complex react with 1 mole of methyl levulinate according to Example 5, there is obtained 1,1,4-tri(phenetyl)-1,4-dihydroxypentane.

EXAMPLE 84a.—PREPARATION OF 1,1,4-TRI-(PHENETYL)-1,3-PENTADIENE

Dehydration of 1,1,4-tri(phenetyl)-1,4-dihydroxypentane by refluxing it in glacial acetic acid with a crystal of iodine leads to 1,1,4-tri(phenetyl)-1,3-pentadiene.

EXAMPLE 85.—PREPARATION OF 5,5-DIANISYL-LEVULINIC ACID

Two moles of anisylmagnesium chloride-tetrahydrofuran complex reacts with 1 mole of furoyl chloride under the conditions of Example 5 to give first dianisyl(α-furyl)carbinol. When the latter is boiled with dilute hydrochloric acid, ring opening occurs, giving 5,5-dianisyl-levulinic acid.

EXAMPLE 86.—PREPARATION OF DI(3,4-DICHLOROPHENYL)METHYLCARBINOL

When 2 moles of 3,4-dichlorophenylmagnesium chloride-tetrahydrofuran complex is allowed to react with 1 mole of ethyl acetate under the conditions of Example 6, there is obtained di(3,4-dichlorophenyl)methylcarbinol.

EXAMPLE 87.—PREPARATION OF ETHYL DI(3,4-DICHLOROPHENYL)HYDROXYACETATE

Two moles of 3,4-dichlorophenylmagnesium chloride-tetrahydrofuran complex react with 1 mole of diethyl oxalate by the procedure of Example 5 to give ethyl di(3,4-dichlorophenyl)hydroxyacetate.

EXAMPLE 88.—PREPARATION OF 1,1,4,4-TETRA-(3,4-DICHLOROPHENYL)-1,4-DIHYDROXYBUTANE

When 4 moles of 3,4-dichlorophenylmagnesium chloride-tetrahydrofuran complex and 1 mole of dibutyl succinate react together, the resulting product is 1,1,4,4-tetra(3,4-dichlorophenyl)-1,4-dihydroxybutane.

EXAMPLE 88a.—PREPARATION OF 1,1,4,4-TETRA(3,4-DICHLOROPHENYL)-1,3-BUTADIENE

Dehydration of 1,1,4,4-tetra(3,4-dichlorophenyl)-1,4-dihydroxybutane by refluxing it in benzene with a trace of p-toluenesulfonic acid gives 1,1,4,4-tetra(3,4-dichlorophenyl)-1,3-butadiene.

EXAMPLE 89.—PREPARATION OF 3,4-DICHLOROPHENYL METHYL KETONE

The reaction of 1 mole of 3,4-dichlorophenylmagnesium chloride-tetrahydrofuran complex and 1 mole of acetyl chloride in the presence of zinc chloride as described in Example 29 yields 3,4-dichlorophenyl methyl ketone.

EXAMPLE 90.—PREPARATION OF 3,4-DICHLOROPHENYL METHYL KETONE 3,4-dichlorophenyl methyl ketone is prepared by the reaction of equimolar quantities of 3,4-dichlorophenylmagnesium chloride-tetrahydrofuran complex and acetonitrile under the conditions of Example 5.

EXAMPLE 91.—PREPARATION OF DI(2,4,5-TRICHLOROPHENYL)METHYLCARBINOL

When 2 moles of 2,4,5-trichlorophenylmagnesium chloride-tetrahydrofuran complex is allowed to react with 1 mole of ethyl acetate under the conditions of Example 6, there is obtained di(2,4,5-trichlorophenyl)methylcarbinol.

EXAMPLE 92.—PREPARATION OF ETHYL DI(2,4,5-TRICHLOROPHENYL)HYDROXYACETATE

Two moles of 2,4,5-trichlorophenylmagnesium chloride-tetrahydrofuran complex react with 1 mole of diethyl oxalate by the procedure of Example 5 to give ethyl di(2,4,5-trichlorophenyl)hydroxyacetate.

EXAMPLE 93.—PREPARATION OF 1,1,4,4-TETRA(2,4,5-TRICHLOROPHENYL)-1,4-DIHYDROXYBUTANE

When 4 moles of 2,4,5-trichlorophenylmagnesium chloride-tetrahydrofuran complex and 1 mole of dibutyl succinate react together, the resulting product is 1,1,4,4-tetra(2,4,5-trichlorophenyl)-1,4-dihydroxybutane.

EXAMPLE 93a.—PREPARATION OF 1,1,4,4-TETRA(2,4,5-TRICHLOROPHENYL)-1,3-BUTADIENE

Dehydration of the product of Example 93 by the process of Example 15a yields 1,1,4,4-tetra(2,4,5-trichlorophenyl)-1,3-butadiene.

EXAMPLE 94.—PREPARATION OF 2,4,5-TRICHLOROPHENYL METHYL KETONE

The reaction of 1 mole of 2,4,5-trichlorophenylmagnesium chloride-tetrahydrofuran complex and 1 mole of acetyl chloride in the presence of zinc chloride as described in Example 29 yields 2,4,5-trichlorophenyl methyl ketone.

EXAMPLE 95.—PREPARATION OF 2,4,5-TRICHLOROPHENYL METHYL KETONE 2,4,5-trichlorophenyl methyl ketone is prepared by the reaction of equimolar quantities of 2,4,5-trichlorophenylmagnesium chloride-tetrahydrofuran complex and acetonitrile under the conditions of Example 5.

EXAMPLE 96.—PREPARATION OF DI(1,2,4,5-TETRACHLOROPHENYL)METHYLCARBINOL

When 2 moles of 1,2,4,5-tetrachlorophenylmagnesium-chloride-tetrahydrofuran complex is allowed to react with 1 mole of ethyl acetate under the conditions of Example 6, there is obtained di(1,2,4,5-tetrachlorophenyl)methylcarbinol.

EXAMPLE 97.—PREPARATION OF ETHYL DI(1,2,4,5-TETRACHLOROPHENYL)HYDROXYACETATE

Two moles of 1,2,4,5-tetrachlorophenylmagnesium chloride-tetrahydrofuran complex react with 1 mole of diethyl oxalate by the procedure of Example 5 to give ethyl di(1,2,4,5-tetrachlorophenyl)hydroxyacetate.

EXAMPLE 98.—PREPARATION OF 1,1,4,4-TETRA(1,2,4,5-TETRACHLOROPHENYL)-1,4-DIHYDROXYBUTANE

When 4 moles of 1,2,4,5-tetrachlorophenylmagnesium chloride-tetrahydrofuran complex and 1 mole of dibutyl succinate react together, the resulting product is 1,1,4,4-tetra(1,2,4,5-tetrachlorophenyl)1,4-dihydroxybutane.

EXAMPLE 98a.—PREPARATION OF 1,1,4,4-TETRA(1,2,-4,5-TETRACHLOROPHENYL)-1,3-BUTADIENE

Dehydration of 1,1,4,4-tetra(1,2,4,5-tetrachlorophenyl)-1,4-dihydroxybutane by refluxing it in benzene with a trace of p-toluenesulfonic acid gives 1,1,4,4-tetra(1,2,4,5-tetrachlorophenyl)-1,3-butadiene.

EXAMPLE 99.—PREPARATION OF 1,2,4,5-TETRACHLOROPHENYL METHYL KETONE

The reaction of 1 mole of 1,2,4,5-tetrachlorophenyl-magnesium chloride-tetrahydrofuran complex and 1 mole of acetyl chloride in the presence of zinc chloride as described in Example 29 yields 1,2,4,5-tetrachlorophenyl methyl ketone.

EXAMPLE 100.—PREPARATION OF 1,2,4,5-TETRACHLOROPHENYL METHYL KETONE 1,2,4,5-tetrachlorophenyl methyl ketone is prepared by the reaction of equimolar quantities of 1,2,4,5-tetrachlorophenylmagnesium chloride-tetrahydrofuran complex and acetonitrile under the conditions of Example 5.

EXAMPLE 101.—PREPARATION OF DI(2,3,4,5,6-PENTACHLOROPHENYL)METHYLCARBINOL

When 2 moles of 2,3,4,5,6-pentachlorophenylmagnesium chloride-tetrahydrofuran complex is allowed to react with 1 mole of ethyl acetate under the conditions of Example 6, there is obtained di(2,3,4,5,6-pentachlorophenyl)methylcarbinol.

EXAMPLE 102.—PREPARATION OF ETHYL DI(2,3,4,5,6-PENTACHLOROPHENYL)HYDROXYACETATE

Two moles of 2,3,4,5,6-pentachlorophenylmagnesium chloride-tetrahydrofuran complex react with 1 mole of diethyl oxalate by the procedure of Example 5 to give ethyl di(2,3,4,5,6-pentachlorophenyl)hydroxyacetate.

EXAMPLE 103.—PREPARATION OF 1,1,4,4-TETRA(2,3,4,5,6-PENTACHLOROPHENYL)-1,4-DIHYDROXYBUTANE

When 4 moles of 2,3,4,5,6-pentachlorophenylmagnesium chloride-tetrahydrofuran complex and 1 mole of dibutyl succinate react together, the resulting product is 1,1,4,4 - tetra(2,3,4,5,6 - pentachlorophenyl) - 1,4 - dihydroxybutane.

EXAMPLE 103a.—PREPARATION OF 1,1,4,4-TETRA(2,3,4,5,6-PENTACHLOROPHENYL)-1,3-BUTADIENE

Dehydration of the product of Example 103 by the process of Example 15a gives 1,1,4,4-tetra(2,3,4,5,6-pentachlorophenyl)-1,3-butadiene.

EXAMPLE 104.—PREPARATION OF 2,3,4,5,6-PENTACHLOROPHENYL METHYL KETONE

The reaction of 1 mole of 2,3,4,5,6-pentachlorophenylmagnesium chloride-tetrahydrofuran complex and 1 mole of acetyl chloride in the presence of zinc chloride as described in Example 29 yields 2,3,4,5,6-pentachlorophenyl methyl ketone.

EXAMPLE 105.—PREPARATION OF 2,3,4,5,6-PENTACHLOROPHENYL METHYL KETONE 2,3,4,5,6-pentachlorophenyl methyl ketone is prepared by the reaction of equimolar quantities of 2,3,4,5,6-pentachlorophenylmagnesium chloride-tetrahydrofuran complex and acetonitrile under the conditions of Example 5.

EXAMPLE 106.—PREPARATION OF 2,6-DIMETHYLBENZALDEHYDE

One mole of 2-m-xylylmagnesium chloride-tetrahydrofuran complex is added to a stirred solution of 4 moles of methyl formate in tetrahydrofuran in the manner described in Example 5. From the organic layer there is isolated 2,6-dimethylbenzaldehyde.

EXAMPLE 107.—PREPARATION OF DI(2-m-XYLYL)-METHYLCARBINOL

The reaction of 2 moles of 2-m-xylylmagnesium chloride-tetrahydrofuran complex and 1 mole of ethyl acetate according to the procedure of Example 5 yields di(2-m-xylyl)methylcarbinol.

EXAMPLE 108.—PREPARATION OF BUTYL 4,4-DI(2-m-XYLYL)-4-HYDROXYBUTYRATE

When 2 moles of 2-m-xylylmagnesium chloride-tetrahydrofuran complex react with 1 mole of dibutyl succinate under the conditions of Example 6, there is obtained butyl 4,4-di(2-m-xylyl)-4-hydroxybutyrate.

EXAMPLE 109.—PREPARATION OF 1,1,4-TRI(2-m-XYLYL)-1,4-DIHYDROXYPENTANE

Three moles of 2-m-xylylmagnesium chloride-tetrahydrofuran complex react with 1 mole of methyl levulinate by the process of Example 5. The resulting product is 1,1,4-tri(2-m-xylyl)-1,4-dihydroxypentane.

EXAMPLE 109a.—PREPARATION OF 1,1,4-TRI(2-m-XYLYL)-1,3-PENTADIENE

Dehydration of 1,1,4-tri(2-m-xylyl)-1,4-dehydroxypentane by the process given in Example 15a gives 1,1,4-tri(2-m-xylyl)-1,3-pentadiene.

EXAMPLE 110.—PREPARATION OF 5,5-DI(2-m-XYLYL)LEVULINIC ACID

Two moles of 2-m-xylylmagnesium chloride-tetrahydrofuran complex react with 1 mole of furoyl chloride under the conditions of Example 5 to give as the first product, di(2-m-xylyl)α-furylcarbinol. When the latter is boiled with dilute hydrochloric acid, ring opening occurs, giving 5,5-di(2-m-xylyl)levulinic acid.

EXAMPLE 111.—PREPARATION OF DI(BIPHENYLYL)-METHYLCARBINOL

The reaction of 2 moles of biphenylylmagnesium chloride-tetrahydrofuran complex with 1 mole of ethyl acetate according to the process of Example 5 yields di(biphenylyl)methylcarbinol.

EXAMPLE 112.—PREPARATION OF 1,1-DI(BIPHENYLYL)-1-DODECANOL

When 2 moles of biphenylylmagnesium chloride-tetrahydrofuran complex react with 1 mole of butyl laurate by the method of Example 6, there is obtained 1,1-di(biphenylyl)-1-dodecanol.

EXAMPLE 113.—PREPARATION OF ETHYL DI(BIPHENYLYL)HYDROXY ACETATE

Ethyl di(biphenylyl)hydroxyacetate is prepared by allowing 2 moles of biphenylylmagnesium chloride-tetrahydrofuran complex to react with 1 mole of diethyl oxalate under the conditions of Example 5.

EXAMPLE 114.—PREPARATION OF ETHYL 10,10-DI(BIPHENYLYL)-10-HYDROXYCAPRATE

The reaction of 2 moles of biphenylylmagnesium chloride-tetrahydrofuran complex with 1 mole of diethyl sebacate according to Example 5 yields ethyl 10,10-di(biphenylyl)-10-hydroxycaprate.

EXAMPLE 114a.—PREPARATION OF ETHYL 10,10-DI(BIPHENYLYL)-9-DECENOATE

The product of Example 114 is dehydrated in the manner described in Example 12a to give ethyl 10,10-di(biphenylyl)-9-decenoate.

EXAMPLE 115.—PREPARATION OF METHYL 4-BIPHENYLYL-4-HYDROXYVALERATE

Equimolar quantities of biphenylylmagnesium chloride-tetrahydrofuran complex and methyl levulinate are allowed to react according to Example 6, and there is obtained methyl 4-biphenylyl-4-hydroxyvalerate.

EXAMPLE 116.—PREPARATION OF BIPHENYLYL PHENYL KETONE

One mole of biphenylylmagnesium chloride-tetrahydrofuran complex, 0.5 mole of zinc chloride, and 1 mole of benzoyl chloride react according to Example 29 to yield biphenylyl phenyl ketone.

EXAMPLE 117.—PREPARATION OF β-BIPHENYLYL-PROPIONITRILE

One mole of biphenylylmagnesium chloride-tetrahydrofuran complex reacts with one mole of acrylonitrile according to the procedure of Example 6. 1,4-addition occurs primarily, giving β-biphenylylpropionitrile.

EXAMPLE 118.—PREPARATION OF METHYL 4-TRICHLOROBIPHENYLYL-4-HYDROXYVALERATE

Equimolar quantities of trichlorobiphenylylmagnesium chloride-tetrahydrofuran complex and methyl levulinate are allowed to react together by the process of Example 6, and the resulting product is methyl 4-trichlorobiphenylyl-4-hydroxyvalerate.

EXAMPLE 118a.—PREPARATION OF METHYL 4-TRICHLOROBIPHENYLYL-3-PENTENOATE

Dehydration of the product from Example 118 by the procedure of Example 15a gives methyl 4-trichlorobiphenylyl-3-pentenoate.

EXAMPLE 119.—PREPARATION OF METHYL 4-NONACHLOROBIPHENYLYL-4-HYDROXYVALERATE

Equimolar quantities of nonachlorobiphenylylmagnesium chloride-tetrahydrofuran complex and methyl levulinate are allowed to react by the procedure of Example 5 to yield methyl 4-nonachlorobiphenylyl-4-hydroxyvalerate.

EXAMPLE 120.—PREPARATION OF NAPHTHALDEHYDE

One mole of naphthylmagnesium chloride-tetrahydrofuran complex is added to a stirred solution of 4 moles of methyl formate in tetrahydrofuran in the manner described in Example 4. From the organic layer, there is isolated naphthaldehyde.

EXAMPLE 121.—PREPARATION OF DINAPHTHYL-METHYLCARBINOL

The reaction of 2 moles of naphthylmagnesium chloride-tetrahydrofuran complex and 1 mole of ethyl acetate according to the process of Example 5 yields dinaphthylmethylcarbinol.

EXAMPLE 122.—PREPARATION OF NAPHTHYL METHYL KETONE

The process of Example 29 is followed using 1 mole of naphthylmagnesium chloride-tetrahydrofuran complex, 0.5 mole of zinc chloride, and 1 mole of acetyl chloride as reactants. The product thus obtained is naphthyl methyl ketone.

EXAMPLE 123.—PREPARATION OF ETHYL DI(CHLORONAPHTHYL)HYDROXYACETATE

When 2 moles of chloronaphthylmagnesium chloride-tetrahydrofuran complex react with 1 mole of diethyl oxalate, under the conditions of Example 5, the final product is ethyl di(chloronaphthyl)hydroxyacetate.

EXAMPLE 124.—PREPARATION OF CHLORONAPHTHYL METHYL KETONE

Equimolar quantities of chloronaphthylmagnesium chloride-tetrahydrofuran complex and acetyl chloride in the presence of zinc chloride react together in the manner described in Example 29 to give chloronaphthyl methyl ketone.

EXAMPLE 125.—PREPARATION OF DI(TRIFLUOROMETHYLPHENYL)METHYLCARBINOL

The reaction of 2 moles of trifluoromethylphenylmagnesium chloride-tetrahydrofuran complex and 1 mole of ethyl acetate according to the procedure of Example 5 yields di(trifluoromethylphenyl)methylcarbinol.

EXAMPLE 125a.—PREPARATION OF α,α-DI(TRIFLUOROMETHYLPHENYL)ETHYLENE

The product from Example 125 is dehydrated under the conditions of Example 12a, giving α,α-di(trifluoromethylphenyl)ethylene.

EXAMPLE 126.—PREPARATION OF ETHYL DI(TRIFLUOROMETHYLPHENYL)HYDROXYACETATE

When 2 moles of trifluoromethylphenylmagnesium chloride-tetrahydrofuran complex react with 1 mole of diethyl oxalate under the conditions of Example 6, there is obtained ethyl di(trifluoromethylphenyl)hydroxy acetate.

EXAMPLE 127.—PREPARATION OF BUTYL 4,4-DI(TRIFLUOROMETHYLPHENYL)-4-HYDROXYBUTYRATE

Two moles of trifluoromethylphenylmagnesium chloride-tetrahydrofuran complex react with 1 mole of dibutyl succinate by the process of Example 5 to yield butyl 4,4-di(trifluoromethylphenyl)-4-hydroxybutyrate.

EXAMPLE 128.—PREPARATION OF 1,1,6,6-TETRA(TRIFLUOROMETHYLPHENYL)-1,6-DIHYDROXYHEXANE

The reaction between 4 moles of trifluoromethylphenylmagnesium chloride-tetrahydrofuran complex and 1 mole of dimethyl adipate by the procedure of Example 6 leads to 1,1,6,6 - tetra(trifluoromethylphenyl) - 1,6 - dihydroxyhexane.

EXAMPLE 129.—PREPARATION OF DI(TRIFLUOROMETHYLPHENYL)PHENYLCARBINOL

When 2 moles of trifluoromethylphenylmagnesium chloride-tetrahydrofuran complex are allowed to react with 1 mole of methyl benzoate under the conditions of Example 5, the resulting product is di(trifluoromethylphenyl)phenylcarbinol.

EXAMPLE 130.—PREPARATION OF 5,5-DI(TRIFLUOROMETHYLPHENYL)LEVULINIC ACID

Two moles of trifluoromethylphenylmagnesium chloride-tetrahydrofuran complex react with 1 mole of methyl furoate under the conditions of Example 5 to give as the first product, di(trifluoromethylphenyl)α-furylcarbinol. When the latter is boiled with dilute hydrochloric acid, ring opening occurs, giving 5,5-di(trifluoromethylphenyl)levulinic acid.

EXAMPLE 131.—PREPARATION OF METHYL 4-TRIFLUOROMETHYLPHENYL-4-HYDROXYVALERATE

Equimolar quantities of trifluoromethylphenylmagnesium chloride-tetrahydrofuran complex and methyl levulinate react together under the conditions of Example 6 to give methyl 4-trifluoromethylphenyl-4-hydroxyvalerate.

EXAMPLE 132.—PREPARATION OF TRIFLUOROMETHYLPHENYL PHENYL KETONE

Trifluoromethylphenylmagnesium chloride-tetrahydrofuran complex, 1 mole, is allowed to react with 1 mole of benzonitrile, following the procedure of Example 6. The product thus obtained is trifluoromethylphenyl phenyl ketone.

EXAMPLE 133.—PREPARATION OF p-DIMETHYLAMINOBENZALDEHYDE

One mole of p-dimethylaminophenylmagnesium chloride-tetrahydrofuran complex is added to a stirred solution of 4 moles of methyl formate in tetrahydrofuran in the manner described in Example 5. When the organic layer is purified, there is obtained p-dimethylaminobenzaldehyde, M. P. 74° C.

EXAMPLE 134.—PREPARATION OF DI(p-DIETHYLAMINOPHENYL)CARBINOL

When 1 mole of methyl formate is added to two moles of p-diethylaminophenylmagnesium chloride-tetrahydrofuran complex under the conditions of Example 6, the resulting product is di(p-diethylaminophenyl)carbinol.

EXAMPLE 135.—PREPARATION OF DI(p-DIMETHYLAMINOPHENYL)METHYL CARBINOL

The reaction between 2 moles of p-dimethylaminophenylmagnesium chloride-tetrahydrofuran complex and 1 mole of ethyl acetate by the process of Example 5 gives di(p-dimethylaminophenyl)methylcarbinol.

EXAMPLE 136.—PREPARATION OF 1,1-DI(p-DIMETHYLAMINOPHENYL)-1-DODECANOL

When 2 moles of p-dimethylaminophenylmagnesium chloride-tetrahydrofuran complex react with 1 mole of butyl laurate by the method of Example 6, there is obtained 1,1-di(p-dimethylaminophenyl)-1-dodecanol.

EXAMPLE 137.—PREPARATION OF 1,1-DI(p-DIMETHYLAMINOPHENYL)OCTADECEN-9-OL-1

Two moles of p-dimethylaminophenylmagnesium chloride-tetrahydrofuran complex react with 1 mole of methyl oleate under the conditions of Example 6 to yield 1,1-di(p-dimethylaminophenyl)octadecen-9-ol-1.

EXAMPLE 138.—PREPARATION OF ETHYL DI(-p-DIETHYLAMINOPHENYL)-HYDROXYACETATE

The reaction of 2 moles of p-diethylaminophenylmagnesium chloride-tetrahydrofuran complex with 1 mole of diethyl oxalate according to the method of Example 5 gives as the final product ethyl di(p-diethylaminophenyl)-hydroxyacetate.

EXAMPLE 139.—PREPARATION OF 1,1,2,2-TETRA(p-DIMETHYLAMINOPHENYL)ETHYLENE GLYCOL

When 4 moles of p-dimethylaminophenylmagnesium chloride-tetrahydrofuran complex are allowed to react with 1 mole of diethyl oxalate in the manner described in Example 6, the product obtained is 1,1,2,2-tetra(p-dimethylaminophenyl)ethylene glycol.

EXAMPLE 140.—PREPARATION OF 1,1,4,4-TETRA(p-DIMETHYLAMINOPHENYL)-1,4-DIHYDROXYBUTANE

The reaction of 4 moles of p-dimethylaminophenylmagnesium chloride-tetrahydrofuran complex and 1 mole of dibutyl succinate by the method of Example 5 leads to 1,1,4,4-tetra(p-dimethylaminophenyl)-1,4-dihydroxybutane.

EXAMPLE 141.—PREPARATION OF 1,1,6,6-TETRA(p-DIMETHYLAMINOPHENYL)-1,6-DIHYDROXYHEXANE

Four moles of p-dimethylaminophenylmagnesium chloride-tetrahydrofuran complex react with 1 mole of dimethyl adipate under the conditions of Example 6 to give 1,1,6,6-tetra(p-dimethylaminophenyl)-1,6-dihydroxyhexane.

EXAMPLE 142.—PREPARATION OF p-PHENYLENE BIS (DI(p-DIMETHYLAMINOPHENYL)CARBINOL)

p-Phenylene bis (di(p-dimethylaminophenyl)carbinol) is prepared by the reaction of 4 moles of p-dimethylaminophenylmagnesium chloride-tetrahydrofuran complex with 1 mole of diethyl terephthalate, using the process of Example 5.

EXAMPLE 145.—PREPARATION OF DI(p-DIMETHYLAMINOPHENYL)ANISYLCARBINOL

Two moles of p-dimethylaminophenylmagnesium chloride-tetrahydrofuran complex are allowed to react with 1 mole of methyl anisate by the method of Example 6. From the organic layer, there is obtained di(p-dimethylaminophenyl)anisylcarbinol.

EXAMPLE 146.—PREPARATION OF DI(p-DIETHYLAMINOPHENYL)α-FURYLCARBINOL

When 2 moles of p-diethylaminophenylmagnesium chloride-tetrahydrofuran complex are caused to react with 1 mole of methyl furoate under the conditions of Example 6, the resulting product is di(p-diethylaminophenyl)α-furylcarbinol.

EXAMPLE 147.—PREPARATION OF DI(p-DIMETHYLAMINOPHENYL) (2,4-DICHLOROPHENOXYMETHYL)-CARBINOL

The reaction between 2 moles of p-dimethylaminophenylmagnesium chloride-tetrahydrofuran complex and 1 mole of butyl 2,4-dichlorophenoxyacetate by the method of Example 5 gives di(p-dimethylaminophenyl) (2,4-dichlorophenoxymethyl)-carbinol.

EXAMPLE 148.—PREPARATION OF 1,1,4-TRI(p-DIMETHYLAMINOPHENYL)-1,4-DIHYDROXYPENTANE

Three moles of p-dimethylaminophenylmagnesium chloride-tetrahydrofuran complex react by the procedure of Example 6 with 1 mole of methyl levulinate to give 1,1,4-tri(p-dimethylaminophenyl)-1,4-dihydroxypentane.

EXAMPLE 149.—PREPARATION OF DI(p-DIMETHYLAMINOPHENYL)METHYLCARBINOL

The reaction of 2 moles of p-dimethylaminophenylmagnesium chloride-tetrahydrofuran complex with 1 mole of acetyl chloride by the method described in Example 5 yields di(p-dimethylaminophenyl)methylcarbinol.

EXAMPLE 150.—PREPARATION OF DIMETHYLAMINOPHENYL METHYL KETONE

When 1 mole of p-dimethylaminophenylmagnesium chloride-tetrahydrofuran complex, 0.5 mole of zinc chloride, and 1 mole of acetyl chloride are allowed to react according to the procedure of Example 29, there is obtained dimethylaminophenyl methyl ketone.

EXAMPLE 151.—PREPARATION OF DIMETHYLAMINOPHENYL PHENYL KETONE

Equimolar quantities of p-dimethylaminophenylmagnesium-chloride-tetrahydrofuran complex and benzoyl chloride (in the presence of zinc chloride) react in the manner described in Example 29 to yield dimethylaminophenyl phenyl ketone.

EXAMPLE 152.—PREPARATION OF DI(p-DIMETHYLAMINOBENZOYL)

Two moles of p-dimethylaminophenylmagnesium chloride-tetrahydrofuran complex react with 1 mole of oxalyl chloride (zinc chloride present) under the conditions of Example 29 to give di(p-dimethylaminobenzoyl).

EXAMPLE 153.—PREPARATION OF ETHYL β-(p-DIMETHYLAMINOBENZOYL PROPIONATE

Equimolar quantities of p-dimethylaminophenylmagnesium chloride and the acid chloride of monoethyl succinate are allowed to react in the manner described in Example 29 (zinc chloride present) to yield ethyl β-(p-dimethylaminobenzoyl) propionate.

EXAMPLE 154.—PREPARATION OF 1,1,6,6-TETRA(p-DIMETHYLAMINOPHENYL)-1,6-DIHYDROXYHEXANE

Four moles of p-dimethylaminophenylmagnesium chloride are allowed to react with 1 mole of adipoyl dichloride under the conditions of Example 5, giving as the final product, 1,1,6,6-tetra(p-dimethylaminophenyl)-1,6-dihydroxyhexane.

EXAMPLE 154a.—PREPARATION OF 1,1,6,6-TETRA(p-DIMETHYLAMINOPHENYL)-1,5-HEXADIENE

The dehydration of the product from Example 154 by the procedure of Example 15a gives 1,1,6,6-tetra(p-dimethylaminophenyl)-1,5-hexadine.

EXAMPLE 155.—PREPARATION OF p-DIMETHYLAMINOPHENYL METHYL KETONE

Equimolar quantities of p-dimethylaminophenylmagnesium chloride-tetrahydrofuran complex and acetonitrile are allowed to react by the method of Example 6. The resulting product is p-dimethylaminophenyl methyl ketone.

EXAMPLE 156.—PREPARATION OF p-DIETHYLAMINOPHENYL PHENYL KETONE

Equimolar quantities of p-diethylaminophenylmagnesium chloride-tetrahydrofuran complex and benzonitrile react by the procedure of Example 5 to yield p-diethylaminophenyl phenyl ketone.

EXAMPLE 157.—PREPARATION OF DI(CHLOROTOLYL) METHYLCARBINOL

Two moles of chlorotolylmagnesium chloride-tetrahydrofuran complex react with 1 mole of ethyl acetate under the conditions of Example 5 to give di(chlorotolyl)methylcarbinol.

EXAMPLE 158.—PREPARATION OF ETHYL DI(CHLOROTOLYL)HYDROXYACETATE

When 2 moles of chlorotolylmagnesium chloride-tetrahydrofuran complex react with 1 mole of diethyl oxalate by the process of Example 6, there is obtained ethyl di(chlorotolyl)hydroxyacetate.

EXAMPLE 159.—PREPARATION OF METHYL 6,6-DI(CHLOROTOYL)-6-HYDROXYCAPROATE

The reaction between 2 moles of chlorotolylmagnesium chloride-tetrahydrofuran complex and 1 mole of dimethyl adipate by the procedure of Example 6 gives as the final product, methyl 6,6-di(chlorotolyl)-6-hydroxycaproate.

EXAMPLE 160.—PREPARATION OF 1,1,6,6-TETRA(CHLOROTOLYL)-1,6-DIHYDROXYHEXANE

Four moles of chlorotolylmagnesium chloride-tetrahydrofuran complex and 1 mole of dimethyl adipate are allowed to react together in the manner described in Example 5. From the organic layer there is isolated 1,1,6,6-tetra(chlorotolyl)-1,6-dihydroxyhexane.

EXAMPLE 161.—PREPARATION OF ETHYL 3,4,4-TRI(CHLOROTOLYL)-4-HYDROXYBUTYRATE

Three moles of chlorotolylmagnesium chloride-tetrahydrofuran complex add to 1 mole of diethyl maleate under the conditions of Example 5 to give ethyl 3,4,4-tri(chlorotolyl)-4-hydroxybutyrate.

EXAMPLE 162.—PREPARATION OF DI(CHLOROTOLYL)PHENYLCARBINOL

The conditions of Example 6 are followed, using 2 moles of chlorotolylmagnesium chloride-tetrahydrofuran complex and 1 mole of methyl benzoate as reactants, and the product isolated from the filtrate is di(chlorotolyl)phenylcarbinol.

EXAMPLE 163.—PREPARATION OF DI(CHLOROTOLYL)-α-FURYLCARBINOL

The reaction between 2 moles of chlorotolylmagnesium chloride-tetrahydrofuran complex and 1 mole of methyl furoate according to the procedure of Example 5 gives di(chlorotolyl)α-furylcarbinol.

EXAMPLE 163a.—PREPARATION OF 5,5-DI(CHLOROTOLYL)LEVULINIC ACID

When di(chlorotolyl)α-furylcarbinol is boiled with dilute hydrochloric acid, ring opening occurs to yield 5,5-di(chlorotolyl)levulinic acid.

EXAMPLE 164.—PREPARATION OF CHLOROTOLYL METHYL KETONE

Equimolar quantities of chlorotolylmagnesium chloride-tetrahydrofuran complex and acetyl chloride react in the presence of zinc chloride in the manner described in Example 29 to give chlorotolyl methyl ketone.

EXAMPLE 165.—PREPARATION OF BIS(CHLOROTOLUYL)

When 2 moles of chlorotolylmagnesium chloride-tetrahydrofuran complex are allowed to react with 1 mole of oxalyl chloride (1 mole of zinc chloride present) by the process of Example 29 there is obtained bis(chlorotoluyl).

EXAMPLE 166.—PREPARATION OF CHLOROTOLYL PHENYL KETONE

Equimolar quantities of chlorotolylmagnesium chloride-tetrahydrofuran complex and benzonitrile are allowed to react under the conditions of Example 5 to give chlorotolyl phenyl ketone.

EXAMPLE 167.—PREPARATION OF DI(CHLOROANISYL)METHYLCARBINOL

Two moles of chloroanisylmagnesium chloride-tetrahydrofuran complex react with 1 mole of ethyl acetate under the conditions of Example 5 to give di(chloroanisyl)methylcarbinol.

EXAMPLE 168.—PREPARATION OF ETHYL DI(CHLOROANISYL)HYDROXYACETATE

When 2 moles of chloroanisylmagnesium chloride-tetrahydrofuran complex react with 1 mole of diethyl oxalate by the process of Example 6, there is obtained ethyl di(chloroanisyl)hydroxyacetate.

EXAMPLE 169.—PREPARATION OF METHYL 6,6-DI(CHLOROANISYL)-6-HYDROXYCAPROATE

The reaction between 2 moles of chloroanisylmagnesium chloride-tetrahydrofuran complex and 1 mole of dimethyl adipate by the procedure of Example 6 gives as the final product, methyl 6,6-di(chloroanisyl)-6-hydroxycaproate.

EXAMPLE 170.—PREPARATION OF 1,1,6,6-TETRA(CHLOROANISYL)-1,6-DIHYDROXYHEXANE

Four moles of chloroanisylmagnesium chloride-tetrahydrofuran complex and 1 mole of dimethyl adipate are allowed to react together in the manner described in Example 5. From the organic layer there is isolated 1,1,6,6-tetra(chloroanisyl)-1,6-dihydroxyhexane.

EXAMPLE 171.—PREPARATION OF ETHYL 3,4,4-TRI(CHLOROANISYL)-4-HYDROXYBUTYRATE

Three moles of chloroanisylmagnesium chloride-tetrahydrofuran complex add to 1 mole of diethyl maleate under the conditions of Example 5 to give ethyl 3,4,4-tri(chloroanisyl)-4-hydroxybutyrate.

EXAMPLE 172.—PREPARATION OF DI(CHLOROANISYL)PHENYLCARBINOL

The conditions of Example 6 are followed, using 2 moles of chloroanisylmagnesium chloride-tetrahydrofuran complex and 1 mole of methyl benzoate as reactants, and the product isolated from the filtrate is di(chloroanisyl)phenylcarbinol.

EXAMPLE 173.—PREPARATION OF DI(CHLOROANISYL)α-FURYLCARBINOL

The reaction between 2 moles of chloroanisylmagnesium chloride-tetrahydrofuran complex and 1 mole of methyl furoate according to the procedure of Example 5 gives di(chloroanisyl)α-furylcarbinol.

EXAMPLE 173a.—PREPARATION OF 5,5-DI(CHLOROANISYL)LEVULINIC

When di(chloroanisyl)α-furylcarbinol is boiled with dilute hydrochloric acid, ring opening occurs to yield 5,5-di(chloroanisyl)levulinic acid.

EXAMPLE 174.—PREPARATION OF CHLOROANISYL METHYL KETONE

Equimolar quantities of chloroanisylmagnesium chloride-tetrahydrofuran complex and acetyl chloride react in the presence of zinc chloride in the manner described in Example 29 to give chloroanisyl methyl ketone.

EXAMPLE 175.—PREPARATION OF BIS(CHLOROANISOYL)

When 2 moles of chloroanisylmagnesium chloride-tetrahydrofuran complex are allowed to react with 1 mole of oxalyl chloride (1 mole of zinc chloride present) by the process of Example 29 there is obtained bis(chloroanisoyl).

EXAMPLE 176.—PREPARATION OF CHLOROANISYL PHENYL KETONE

Equimolar quantities of chloroanisylmagnesium chloride-tetrahydrofuran complex and benzonitrile are allowed to react under the conditions of Example 5 to give chloroanisyl phenyl ketone.

EXAMPLE 177.—PREPARATION OF DI(CHLOROPHENETYL)METHYLCARBINOL

Two moles of chlorophenetylmagnesium chloride-tetrahydrofuran complex react with 1 mole of ethyl acetate under the conditions of Example 5 to give di(chlorophenetyl)methylcarbinol.

EXAMPLE 178.—PREPARATION OF ETHYL DI(CHLOROPHENETYL)HYDROXYACETATE

When 2 moles of chlorophenetylmagnesium chloride-tetrahydrofuran complex react with 1 mole of diethyl oxalate by the process of Example 6, there is obtained ethyl di(chlorophenetyl)hydroxyacetate.

EXAMPLE 179.—PREPARATION OF METHYL 6,6-DI(CHLOROPHENETYL)-6-HYDROXYCAPROATE

The reaction between 2 moles of chlorophenetylmagnesium chloride-tetrahydrofuran complex and 1 mole of dimethyl adipate by the procedure of Example 6 gives as the final product, methyl 6,6-di(chlorophenetyl)-6-hydroxycaproate.

EXAMPLE 180.—PREPARATION OF 1,1,6,6-TETRA(CHLOROPHENETYL)-1,6-DIHYDROXYHEXANE

Four moles of chlorophenetylmagnesium chloride-tetrahydrofuran complex and 1 mole of dimethyl adipate are allowed to react together in the manner described in Example 5. From the organic layer there is isolated 1,1,6,6-tetra(chlorophenetyl)-1,6-hydroxyhexane.

EXAMPLE 181.—PREPARATION OF ETHYL 3,4,4-TRI(CHLOROPHENETYL)-4-HYDROXYBUTYRATE

Three moles of chlorophenetylmagnesium chloride-tetrahydrofuran complex add to 1 mole of diethyl maleate under the conditions of Example 5 to give ethyl 3,4,4-tri(chlorophenetyl)-4-hydroxybutyrate.

EXAMPLE 182.—PREPARATION OF DI(CHLOROPHENETYL)PHENYLCARBINOL

The conditions of Example 6 are followed, using 2 moles of chlorophenetylmagnesium chloride-tetrahydrofuran complex and 1 mole of methyl benzoate as reactants, and the product isolated from the filtrate is di(chlorophenetyl)phenylcarbinol.

EXAMPLE 183.—PREPARATION OF DI(CHLOROPHENETYL)α-FURYLCARBINOL

The reaction between 2 moles of chlorophenetylmagnesium chloride-tetrahydrofuran complex and 1 mole of methyl furoate according to the procedure of Example 5 gives di(chlorophenetyl) α-furylcarbinol.

EXAMPLE 183a.—PREPARATION OF 5,5-DI(CHLOROPHENETYL)LEVULINIC ACID

When di(chlorophenetyl) α-furylcarbinol is boiled with dilute hydrochloric acid, ring opening occurs to yield 5,5-di(chlorophenetyl)levulinic acid.

EXAMPLE 184.—PREPARATION OF CHLOROPHENETYL METHYL KETONE

Equimolar quantities of chlorophenetylmagnesium chloride-tetrahydrofuran complex and acetyl chloride react in the presence of zinc chloride in the manner described in Example 29 to give chlorophenetyl methyl ketone.

EXAMPLE 185.—PREPARATION OF BIS(CHLORO-p-ETHOXYBENZOYL)

When 2 moles of chlorophenetylmagnesium chloride-tetrahydrofuran complex are allowed to react with 1 mole of oxalyl chloride (1 mole of zinc chloride present) by the process of Example 29 there is obtained bis(chloro-p-ethoxy-benzoyl).

EXAMPLE 186.—PREPARATION OF CHLOROPHENETYL PHENYL KETONE

Equimolar quantities of chlorophenetylmagnesium chloride-tetrahydrofuran complex and benzonitrile are allowed to react under the conditions of Example 5 to give chlorophenetyl phenyl ketone.

EXAMPLE 187.—PREPARATION OF DI(ETHYLTETRACHLOROPHENYL)-METHYLCARBINOL

The reaction of 2 moles of ethyltetrachlorophenylmagnesium chloride-tetrahydrofuran complex with 1 mole of ethyl acetate according to the method of Example 5 gives di(ethyltetrachlorophenyl)methylcarbinol.

EXAMPLE 188.—PREPARATION OF 2-THIOPHENEALDEHYDE

One mole of 2-thienylmagnesium chloride-tetrahydrofuran complex is added to a stirred solution of 4 moles of methyl formate in tetrahydrofuran in the manner described in Example 4. From the organic layer there is obtained 2-thiophenealdehyde.

EXAMPLE 189.—PREPARATION OF DI(2-THIENYL)-CARBINOL

When 1 mole of methyl formate is added to 2 moles of 2-thienylmagnesium chloride-tetrahydrofuran complex under the conditions of Example 6, the resulting product is di(2-thienyl)carbinol.

EXAMPLE 190.—PREPARATION OF DI(2-THIENYL)-METHYLCARBINOL

Two moles of 2-thienylmagnesium chloride-tetrahydrofuran complex are allowed to react with 1 mole of ethyl acetate using the procedure of Example 5. The product thus obtained is di(2-thienyl)methylcarbinol.

EXAMPLE 191.—PREPARATION OF ETHYL DI(2-THIENYL)HYDROXYACETATE

The reaction between 2 moles of 2-thienylmagnesium chloride-tetrahydrofuran complex and 1 mole of diethyl oxalate by the method of Example 6 yields ethyl di(2-thienyl)hydroxyacetate.

EXAMPLE 192.—PREPARATION OF 1,1,10,10-TETRA(2-THIENYL)-1,10-DIHYDROXYDECANE

When 4 moles of 2-thienylmagnesium chloride-tetrahydrofuran complex are allowed to react with 1 mole of diethyl sebacate under the conditions of Example 5, there is obtained 1,1,10,10-tetra(2-thienyl)-1,10-dihydroxydecane.

EXAMPLE 193.—PREPARATION OF 3,4,4-TRI(2-THIENYL)4-4HYDROXYBUTYRATE

Three moles of 2-thienylmagnesium chloride-tetrahydrofuran complex add to 1 mole of diethyl maleate under the conditions of Example 5 to give 3,4,4-tri(2-thienyl)-4-hydroxybutyrate.

EXAMPLE 194.—PREPARATION OF DI(2-THIENYL)-PHENYLCARBINOL

The reaction between 2 moles of 2-thienylmagnesium chloride-tetrahydrofuran complex and 1 mole of methyl benzoate is carried out in the manner described in Example 6. From the organic layer there is isolated di(2-thienyl)phenylcarbinol.

EXAMPLE 195.—PREPARATION OF DI(2-THIENYL)α-FURYLCARBINOL

When 2 moles of 2-thienylmagnesium chloride are caused to react with 1 mole of methyl furoate by the procedure of Example 5, there is obtained di(2-thienyl) α-furylcarbinol.

EXAMPLE 196.—PREPARATION OF DI(2-THIENYL)-(3-PYRIDYL)CARBINOL

Two moles of 2-thienylmagnesium chloride-tetrahydrofuran complex react with 1 mole of methyl nicotinate under the conditions of Example 6 to yield di(2-thienyl)(3-pyridyl)-carbinol.

EXAMPLE 197.—PREPARATION OF METHYL 4-(2-THIENYL)4-4HYDROXYVALERATE

Equimolar quantities of 2-thienylmagnesium chloride-tetrahydrofuran complex and methyl levulinate are allowed to react by the procedure of Example 5 to give methyl 4-(2-thienyl)-4-hydroxyvalerate.

EXAMPLE 198.—PREPARATION OF 2-THIENYL METHYL KETONE

The reaction between 1 mole of 2-thienylmagnesium chloride tetrahydrofuran complex, 0.5 mole of zinc chloride, and 1 mole of acetyl chloride by the process of Example 29 gives as the final product 2-thienyl methyl ketone.

EXAMPLE 199.—PREPARATION OF 2-THIENYL PHENYL KETONE

The conditions of Example 29 are followed, using equimolar quantities of 2-thienylmagnesium chloride-tetrahydrofuran complex and benzoyl chloride as reactants in the presence of zinc chloride. The resulting product is 2-thienyl phenyl ketone.

EXAMPLE 200.—PREPARATION OF DI(2-THENOYL)

Two moles of 2-thienylmagnesium chloride-tetrahydrofuran complex react with 1 mole of oxalyl chloride (zinc chloride present) under the conditions of Example 29 to yield di-(2-thenoyl).

EXAMPLE 201.—PREPARATION OF ETHYL β-(2-THENOYL)PROPIONATE

When equimolar quantities of 2-thienylmagnesium chloride-tetrahydrofuran complex and the acid chloride of monoethyl succinate are allowed to react according to Example 29 (zinc chloride present), there is obtained ethyl β-(2-thenoyl)propionate.

EXAMPLE 202.—PREPARATION OF 2-THIENYL α-FURYL KETONE

The reaction between 1 mole of 2-thienylmagnesium chloride-tetrahydrofuran complex, 0.5 mole of zinc chloride, and 1 mole of furoyl chloride in the manner described in Example 29 leads to 2-thienyl α-furyl ketone.

EXAMPLE 203.—PREPARATION OF 2-THIENYL METHYL KETONE

Equimolar quantities of 2-thienylmagnesium chloride-tetrahydrofuran complex and acetonitrile are allowed to react by the procedure of Example 5. The product thus obtained is 2-thienyl methyl ketone.

EXAMPLE 204.—PREPARATION OF 2-THIENYL PHENYL KETONE

One mole of 2-thienylmagnesium chloride-tetrahydrofuran complex reacts with 1 mole of benzonitrile under the conditions of Example 6 to yield 2-thienyl phenyl ketone.

EXAMPLE 205.—PREPARATION OF PYRIDINE-2-ALDEHYDE

One mole of 2-pyridylmagnesium chloride-tetrahydrofuran complex is added to a stirred solution of 4 moles of methyl formate in tetrahydrofuran in the manner described in Example 4. From the organic layer there is obtained pyridine-2-aldehyde.

EXAMPLE 206.—PREPARATION OF DI(2-PYRIDYL)-CARBINOL

When 1 mole of methyl formate is added to 2 moles of 2-pyridylmagnesium chloride-tetrahydrofuran complex under the conditions of Example 6, the resulting product is di(2-pyridyl) carbinol.

EXAMPLE 207.—PREPARATION OF DI(2-PYRIDYL)-METHYLCARBINOL

Two moles of 2-pyridylmagnesium chloride-tetrahydrofuran complex are allowed to react with 1 mole of ethyl acetate using the procedure of Example 5. The product thus obtained is di(2-pyridyl)methylcarbinol.

EXAMPLE 208.—PREPARATION OF ETHYL DI(2-PYRIDYL)HYDROXYACETATE

The reaction between 2 moles of 2-pyridylmagnesium chloride-tetrahydrofuran complex and 1 mole of diethyl oxalate by the method of Example 6 yields ethyl di(2-pyridyl)-hydroxyacetate.

EXAMPLE 209.—PREPARATION OF 1,1,10,10-TETRA(2-PYRIDYL)-1,10-DIHYDROXYDECANE

When 4 moles of 2-pyridylmagnesium chloride-tetrahydrofuran complex are allowed to react with 1 mole of diethyl sebacate under the conditions of Example 5, there is obtained 1,1,10,10-tetra(2-pyridyl)-1,10-dihydroxydecane.

EXAMPLE 210.—PREPARATION OF 3,4,4-TRI(2-PYRIDYL)-4-HYDROXYBUTYRATE

Three moles of 2-pyridylmagnesium chloride-tetrahydrofuran complex add to 1 mole of diethyl maleate under the conditions of Example 5 to give 3,4,4-tri(2-pyridyl)-4-hydroxybutyrate.

EXAMPLE 211.—PREPARATION OF DI(2-PYRIDYL)-PHENLCARBINOL

The reaction between 2 moles of 2-pyridylmagnesium chloride-tetrahydrofuran complex and 1 mole of methyl benzoate is carried out in the manner described in Example 6. From the organic layer there is isolated di(2-pyridyl)phenyl carbinol.

EXAMPLE 212.—PREPARATION OF DI(2-PYRIDYL)α-FURYLCARBINOL

When 2 moles of 2-pyridylmagnesium chloride-tetrahydrofuran complex are caused to react with 1 mole of methyl furoate by the procedure of Example 5, there is obtained di(2-pyridyl)α-furylcarbinol.

EXAMPLE 213.—PREPARATION OF DI(2-PYRIDYL)(3-PYRIDYL)CARBINOL

Two moles of 2-pyridylmagnesium chloride-tetrahydrofuran complex react with 1 mole of methyl nicotinate under the conditions of Example 6 to yield di(2-pyridyl)(3-pyridyl)-carbinol.

EXAMPLE 214.—PREPARATION OF METHYL 4-(2-PYRIDYL)-4-HYDROXYVALERATE

Equimolar quantities of 2-pyridylmagnesium chloride-tetrahydrofuran complex and methyl levulinate are allowed to react by the procedure of Example 5 to give methyl 4-(2-pyridyl)-4-hydroxyvalerate.

EXAMPLE 215.—PREPARATION OF 2-PYRIDYL METHYL KETONE

The reaction between 1 mole of 2-pyridylmagnesium chloride tetrahydrofuran complex, 0.5 mole of zinc chloride, and 1 mole of acetyl chloride by the process of Example 29 gives as the final product 2-pyridyl methyl ketone.

EXAMPLE 216.—PREPARATION OF 2-PYRIDYL PHENYL KETONE

The conditions of Example 29 are followed, using equimolar quantities of 2-pyridylmagnesium chloride-tetrahydrofuran complex and benzoyl chloride as reactants in the presence of zinc chloride. The resulting product is 2-pyridyl phenyl ketone.

EXAMPLE 217.—PREPARATION OF DIPICOLINOYL

Two moles of 2-pyridylmagnesium chloride-tetrahydrofuran complex react with 1 mole of oxalyl chloride (zinc chloride present) under the conditions of Example 29 to yield dipicolinoyl.

EXAMPLE 218.—PREPARATION OF ETHYL β-PICOLINOYLPROPIONATE

When equimolar quantities of 2-pyridylmagnesium chloride-tetrahydrofuran complex and the acid chloride of monoethyl succinate are allowed to react according to Example 29 (zinc chloride present), there is obtained ethyl β-picolinoyl-propionate.

EXAMPLE 219.—PREPARATION OF 2-PYRIDYL α-FURYL KETONE

The reaction between 1 mole of 2-pyridylmagnesium chloride-tetrahydrofuran complex, 0.5 mole of zinc chloride, and 1 mole of furoyl chloride in the manner described in Example 29 leads to 2-pyridyl-α-furyl ketone.

EXAMPLE 220.—PREPARATION OF 2-PYRIDYL METHYL KETONE

Equimolar quantities of 2-pyridylmagnesium chloride-tetrahydrofuran complex and acetonitrile are allowed to react by the procedure of Example 5. The product thus obtained is 2-pyridyl methyl ketone.

EXAMPLE 221.—PREPARATION OF 2-PYRIDYL PHENYL KETONE

One mole of 2-pyridylmagnesium chloride-tetrahydrofuran complex reacts with 1 mole of benzonitrile under the conditions of Example 6 to yield 2-pyridyl phenyl ketone.

EXAMPLE 222.—PREPARATION OF FURFURAL

One mole of α-furylmagnesium chloride-tetrahydrofuran complex is added to a stirred solution of 4 moles of methyl formate in tetrahydrofuran in the manner described in Example 4. From the organic layer there is obtained furfural.

EXAMPLE 223.—PREPARATION OF DI(α-FURYL)-CARBINOL

When 1 mole of methyl formate is added to 2 moles of α-furylmagnesium chloride-tetrahydrofuran complex under the conditions of Example 6, the resulting product is di(α-furyl) carbinol.

EXAMPLE 224.—PREPARATION OF DI(α-FURYL)-METHYLCARBINOL

Two moles of α-furylmagnesium chloride-tetrahydrofuran complex are allowed to react with 1 mole of ethyl acetate using the procedure of Example 5. The product thus obtained is di(α-furyl)methylcarbinol.

EXAMPLE 225.—PREPARATION OF ETHYL DI(α-FURYL)HYDROXYACETATE

The reaction between 2 moles of α-furylmagnesium chloride-tetrahydrofuran complex and 1 mole of diethyl oxalate by the method of Example 6 yields ethyl di(α-furyl)hydroxyacetate.

EXAMPLE 226.—PREPARATION OF 1,1,10,10-TETRA(α-FURYL)-1,10-DIHYDROXYDECANE

When 4 moles of α-furylmagnesium chloride-tetrahydrofuran complex are allowed to react with 1 mole of diethyl sebacate under the conditions of Example 5, there is obtained 1,1,10,10-tetra(α-furyl)-1,10-dihydroxydecane.

EXAMPLE 227.—PREPARATION OF 3,4,4-TRI(α-FURYL)-4-HYDROXYBUTYRATE

Three moles of α-furylmagnesium chloride-tetrahydrofuran complex add to 1 mole of diethyl maleate under the conditions of Example 5 to give 3,4,4-tri(α-furyl)-4-hydroxybutyrate.

EXAMPLE 228.—PREPARATION OF DI(α-FURYL)-PHENYLCARBINOL

The reaction between 2 moles of α-furylmagnesium chloride-tetrahydrofuran complex and 1 mole of methyl benzoate is carried out in the manner described in Example 6. From the organic layer there is isolated di(α-furyl)phenyl-carbinol.

EXAMPLE 229.—PREPARATION OF TRI(α-FURYL)-CARBINOL

When 2 moles of α-furylmagnesium chloride-tetrahydrofuran complex are caused to react with 1 mole of methyl furoate by the procedure of Example 5, there is obtained tri(α-furyl)-carbinol.

EXAMPLE 230.—PREPARATION OF DI(α-FURYL)-(3-PYRIDYL)CARBINOL

Two moles of α-furylmagnesium chloride-tetrahydrofuran complex react with 1 mole of methyl nicotinate under the conditions of Example 6 to yield di(α-furyl) (3-pyridyl)-carbinol.

EXAMPLE 231.—PREPARATION OF METHYL 4-(α-FURYL)-4-HYDROXYVALERATE

Equimolar quantities of α-furylmagnesium chloride-tetrahydrofuran complex and methyl levulinate are allowed to react by the procedure of Example 5 to give methyl 4-(α-furyl)-4-hydroxyvalerate.

EXAMPLE 232.—PREPARATION OF α-FURYL METHYL KETONE

The reaction between 1 mole of α-furylmagnesium chloride-tetrahydrofuran complex, 0.5 mole of zinc chloride, and 1 mole of acetyl chloride by the process of Example 29 gives as the final product α-furyl methyl ketone.

EXAMPLE 233.—PREPARATION OF α-FURYL PHENYL KETONE

The conditions of Example 29 are followed, using equimolar quantities of α-furylmagnesium chloride-tetrahydrofuran complex and benzoyl chloride as reactants in the presence of zinc chloride. The resulting product is α-furyl phenyl ketone.

EXAMPLE 234.—PREPARATION OF DI(α-FUROYL)

Two moles of α-furylmagnesium chloride-tetrahydrofuran complex react with 1 mole of oxalyl chloride (zinc chloride present) under the conditions of Example 29 to yield di-(α-furoyl).

EXAMPLE 235.—PREPARATION OF ETHYL β-(α-FUROYL)PROPIONATE

When equimolar quantities of α-furylmagnesium chloride-tetrahydrofuran complex and the acid chloride of monoethyl succinate are allowed to react according to Example 29 (zinc chloride present), there is obtained ethyl β-(α-furyl) propionate.

EXAMPLE 236.—PREPARATION OF α-FURYL METHYL KETONE

Equimolar quantities of α-furylmagnesium chloride-tetrahydrofuran complex and acetonitrile are allowed to react by the procedure of Example 5. The product thus obtained is α-furyl methyl ketone.

EXAMPLE 237.—PREPARATION OF DI(α-FURYL) KETONE

The reaction between 1 mole of α-furylmagnesium chloride-tetrahydrofuran complex, 0.5 mole of zinc chloride, and 1 mole of furoyl chloride in the manner described in Example 29 leads to di(α-furyl) ketone.

EXAMPLE 238.—PREPARATION OF α-FURYL PHENYL KETONE

One mole of α-furylmagnesium chloride-tetrahydrofuran complex reacts with 1 mole of benzonitrile under the conditions of Example 6 to yield α-furyl phenyl ketone.

EXAMPLE 239.—PREPARATION OF 5-CHLORO-2-THIOPHENEALDEHYDE

One mole of 5-chloro-2-thienylmagnesium chloride-tetrahydrofuran complex is added to a stirred solution of 4 moles of methyl formate in tetrahydrofuran in the manner described in Example 4. From the organic layer there is obtained 5-chloro-2-thiophenealdehyde.

EXAMPLE 240.—PREPARATION OF DI(5-CHLORO-2-THIENYL)CARBINOL

When 1 mole of methyl formate is added to 2 moles of 5-chloro-2-thienylmagnesium chloride-tetrahydrofuran complex under the conditions of Example 6, the resulting product is di(5-chloro-2-thienyl)carbinol.

EXAMPLE 241.—PREPARATION OF DI(5-CHLORO-2-THIENYL)METHYLCARBINOL

Two moles of 5-chloro-2-thienylmagnesium chloride-tetrahydrofuran complex are allowed to react with 1 mole of ethyl acetate using the procedure of Example 5. The product thus obtained is di(5-chloro-2-thienyl)methylcarbinol.

EXAMPLE 242.—PREPARATION OF ETHYL DI(5-CHLORO-2-THIENYL)-HYDROXYACETATE

The reaction between 2 moles of 5-chloro-2-thienylmagnesium chloride-tetrahydrofuran complex and 1 mole of diethyl oxalate by the method of Example 6 yields ethyl di(5-chloro-2-thienyl)hydroxyacetate.

EXAMPLE 243.—PREPARATION OF 1,1,10,10-TETRA(5-CHLORO-2-THIENYL)-1,10-DIHYDROXYDECANE

When 4 moles of 5-chloro-2-thienylmagnesium chloride-tetrahydrofuran complex are allowed to react with 1 mole of diethyl sebacate under the conditions of Example 5, there is obtained 1,1,10,10-tetra(5-chloro-2-thienyl)-1,10-dihydroxydecane.

EXAMPLE 244.—PREPARATION OF 3,4,4-TRI(5-CHLORO-2-THIENYL)-4-HYDROXYBUTYRATE

Three moles of 5-chloro-2-thienylmagnesium chloride-tetrahydrofuran complex add to 1 mole of diethyl maleate under the conditions of Example 5 to give 3,4,4-tri(5-chloro-2-thienyl)4-hydroxybutyrate.

EXAMPLE 245.—PREPARATION OF DI(5-CHLORO-2-THIENYL)PHENYLCARBINOL

The reaction between 2 moles of 5-chloro-2-thienylmagnesium chloride-tetrahydrofuran complex and 1 mole of methyl benzoate is carried out in the manner described in Example 6. From the organic layer there is isolated di(5-chloro-2-thienyl)phenylcarbinol.

EXAMPLE 246.—PREPARATION OF DI(5-CHLORO-2-THIENYL)α-FURYLCARBINOL

When 2 moles of 5-chloro-2-thienylmagnesium chloride-tetrahydrofuran complex are caused to react with 1 mole of methyl furoate by the procedure of Example 5, there is obtained di(5-chloro-2-thienyl)α-furylcarbinol.

EXAMPLE 247.—PREPARATION OF DI(5-CHLORO-2-THIENYL)(3-PYRIDYL)CARBINOL

Two moles of 5-chloro-2-thienylmagnesium chloride-tetrahydrofuran complex react with 1 mole of methyl nicotinate under the conditions of Example 6 to yield di(5-chloro-2-thienyl)(3-pyridyl)carbinol.

EXAMPLE 248.—PREPARATION OF METHYL 4-(5-CHLORO-2-THIENYL)-4-HYDROXYVALERATE

Equimolar quantities of 5-chloro-2-thienylmagnesium chloride-tetrahydrofuran complex and methyl levulinate are allowed to react by the procedure of Example 5 to give methyl 4-(5-chloro-2-thienyl)-4-hydroxyvalerate.

EXAMPLE 249.—PREPARATION OF 5-CHLORO-2-THIENYL METHYL KETONE

The reaction between 1 mole of 5-chloro-2-thienylmagnesium chloride-tetrahydrofuran complex, 0.5 mole of the zinc chloride, and 1 mole of acetyl chloride by the process of Example 29 gives as the final product 5-chloro-2-thienyl methyl ketone.

EXAMPLE 250.—PREPARATION OF 5-CHLORO-2-THIENYL PHENYL KETONE

The conditions of Example 29 are followed, using equimolar quantities of 5-chloro-2-thienylmagnesium chloride-tetrahydrofuran complex and benzoyl chloride as reactants in the presence of zinc chloride. The resulting product is 5-chloro-2-thienyl phenyl ketone.

EXAMPLE 251.—PREPARATION OF DI(5-CHLORO-2-THENOYL)

Two moles of 5-chloro-2-thienylmagnesium chloride-tetrahydrofuran complex react with 1 mole of oxalyl chloride(zinc chloride present) under the conditions of Example 29 to yield di(5-chloro-2-thenoyl).

EXAMPLE 252.—PREPARATION OF ETHYL β-(5-CHLORO-2-THENOYL)PROPIONATE

When equimolar quanities of 5-chloro-2-thienylmagnesium chloride-tetrahydrofuran complex and the acid chloride of monoethyl succinate are allowed to react according to Example 29 (zinc chloride present), there is obtained ethyl β-(5-chloro-2-thenoyl)propionate.

EXAMPLE 253.—PREPARATION OF 5-CHLORO-2-THIENYL α-FURYL KETONE

The reaction between 1 mole of 5-chloro-2-thienylmagnesium chloride-tetrahydrofuran complex, 0.5 mole of zinc chloride, and 1 mole of furoyl chloride in the manner described in Example 29 leads to 5-chloro-2-thienyl α-furyl ketone.

EXAMPLE 254.—PREPARATION OF 5-CHLORO-2-THIENYL METHYL KETONE

Equimolar quantities of 5-chloro-2-thienylmagnesium chloride-tetrahydrofuran complex and acetonitrile are allowed to react by the procedure of Example 5. The product thus obtained is 5-chloro-2-thienyl methyl ketone.

EXAMPLE 255.—PREPARATION OF 5-CHLORO-2-THIENYL PHENYL KETONE

One mole of 5-chloro-2-thienylmagnesium chloride-tetrahydrofuran complex reacts with 1 mole of benzonitrile under the conditions of Example 6 to yield 5-chloro-2-thienyl phenyl ketone.

EXAMPLE 256.—PREPARATION OF DI(o-FLUOROPHENYL)CARBINOL

When 1 mole of methyl formate is added to 2 moles of o-fluorophenylmagnesium chloride- tetrahydrofuran complex under the conditions of Example 6, the resulting product is di(o-fluorophenyl)carbinol.

EXAMPLE 257.—PREPARATION OF DI(o-FLUOROPHENYL)METHYLCARBINOL

Two moles of o-fluorophenylmagnesium chloride-tetrahydrofuran complex are allowed to react with 1 mole of ethyl acetate using the procedure of Example 5. The product thus obtained is di(o-fluorophenyl)methylcarbinol.

EXAMPLE 258.—PREPARATION OF DI(m-FLUOROPHENYL)CARBINOL

The reaction between 2 moles of m-fluorophenylmagnesium chloride-tetrahydrofuran complex and 1 mole of methyl formate by the method of Example 6 yields di(m-fluorophenyl)carbinol.

EXAMPLE 259.—PREPARATION OF DI(m-FLUOROPHENYL)METHYLCARBINOL

When two moles of m-fluorophenylmagnesium chloride-tetrahydrofuran complex are allowed to react with 1 mole of ethyl acetate under the conditions of Example 5, there is obtained di(m-fluorophenyl)methylcarbinol.

EXAMPLE 260.—PREPARATION OF DI(p-FLUOROPHENYL)CARBINOL

When 1 mole of methyl formate is added to 2 moles of p-fluorophenylmagnesium chloride-tetrahydrofuran complex in the manner described in Example 6, the resulting product is di(p-fluorophenyl)carbinol.

EXAMPLE 261.—PREPARATION OF DI(p-FLUOROPHENYL)METHYLCARBINOL

Two moles of p-fluorophenylmagnesium chloride-tetrahydrofuran complex are allowed to react with 1 mole of ethyl acetate using the procedure of Example 5. The product thus obtained is di(p-fluorophenyl)methylcarbinol.

EXAMPLE 262.—PREPARATION OF DI(DIFLUOROPHENYL)CARBINOL

When 1 mole of methyl formate is added to 2 moles of difluorophenylmagnesium chloride-tetrahydrofuran complex under the conditions of Example 6, the resulting product is di(difluorophenyl)carbinol.

EXAMPLE 263.—PREPARATION OF DI(DIFLUOROPHENYL)METHYLCARBINOL

Two moles of difluorophenylmagnesium chloride-tetrahydrofuran complex are allowed to react with 1 mole of ethyl acetate using the procedure of Example 5. The product thus obtained is di(difluorophenyl)methylcarbinol.

EXAMPLE 264.—PREPARATION OF DI(TRIFLUOROPHENYL) CARBINOL

The reaction between 2 moles of trifluorophenylmagnesium chloride-tetrahydrofuran complex and 1 mole of methyl formate by the method of Example 6 yields di(trifluorophenyl)carbinol.

EXAMPLE 265.—PREPARATION OF DI(TRIFLUOROPHENYL) METHYLCARBINOL

When 2 moles of trifluorophenylmagnesium chloride-tetrahydrofuran complex are allowed to react with 1 mole of ethyl acetate under the conditions of Example 5, there is obtained di(trifluorophenyl) methylcarbinol.

EXAMPLE 266.—PREPARATION OF DI(PENTAFLUOROPHENYL) CARBINOL

When 1 mole of methyl formate is added to 2 moles of pentafluorophenylmagnesium chloride-tetrahydrofuran complex in the manner described in Example 6, the resulting product is di(pentafluorophenyl) carbinol.

EXAMPLE 267.—PREPARATION OF DI(PENTAFLUOROPHENYL) METHYLCARBINOL

Two moles of pentafluorophenylmagnesium chloride-tetrahydrofuran complex are allowed to react with 1 mole of ethyl acetate using the procedure of Example 5. The product thus obtained is di(pentafluorophenyl) methylcarbinol.

EXAMPLE 268.—PREPARATION OF DI(2-BENZOTHIAZOLYL) METHYLCARBINOL

The reaction of 2 moles of 2-benzothiazolylmagnesium chloride-tetrahydrofuran complex with 1 mole of ethyl acetate according to the method of Example 5 gives di(2-benzothiazolyl) methylcarbinol.

EXAMPLE 269.—PREPARATION OF DI(2-BENZOXAZOLYL) METHYLCARBINOL

When 2 moles of 2-benzoxazolylmagnesium chloride-tetrahydrofuran complex react with 1 mole of ethyl acetate by the procedure of Example 6, the resulting product is di(2-benzoxazolyl) methylcarbinol.

EXAMPLE 270.—PREPARATION OF DI(2-METHYL-5-BENZOTHIAZOLYL) METHYLCARBINOL

Two moles of 2-methyl-5-benzothiazolylmagnesium chloride-tetrahydrofuran complex are allowed to react with 1 mole of ethyl acetate using the procedure of Example 5. The product thus obtained is di(2-methyl-5-benzothiazolyl) methylcarbinol.

EXAMPLE 271.—PREPARATION OF DI(2-QUINOLYL) METHYLCARBINOL

When 1 mole of ethyl acetate is added to 2 moles of 2-quinolylmagnesium chloride-tetrahydrofuran complex in the manner described in Example 6, there is obtained di(2-quinolyl)-methylcarbinol.

EXAMPLE 272.—PREPARATION OF DI(6-QUINOLYL) METHYLCARBINOL

The reaction of 2 moles of 6-quinolylmagnesium chloride-tetrahydrofuran complex with 1 mole of ethyl acetate according to the method of Example 5 yields di(6-quinolyl) methylcarbinol.

EXAMPLE 273.—PREPARATION OF DI(8-QUINOLYL) METHYLCARBINOL

When 2 moles of 8-quinolylmagnesium chloride-tetrahydrofuran complex react with 1 mole of ethyl acetate by the procedure of Example 6, the resulting product is di(8-quinolyl) methylcarbinol.

EXAMPLE 274.—PREPARATION OF DI(6-CHLORO-2-METHOXY-9-ACRIDYL) METHYLCARBINOL

Two moles of 6-chloro-2-methoxy-9-acridylmagnesium chloride tetrahydrofuran complex are allowed to react with 1 mole of ethyl acetate using the procedure of Example 5. The product thus obtained is di(6-chloro-2-methoxy-9-acridyl) methylcarbinol.

EXAMPLE 275.—PREPARATION OF DI(4-CHLORO-6-PYRIMIDYL) METHYLCARBINOL

When 1 mole of ethyl acetate is added to 2 moles of 4-chloro-6-pyrimidylmagnesium chloride-tetrahydrofuran complex in the manner described in Example 6, there is obtained di(4-chloro-6-pyrimidyl) methylcarbinol.

EXAMPLE 276.—PREPARATION OF DI(4,5,6-TRICHLORO-2-PYRIMIDYL) METHYLCARBINOL

The reaction of 2 moles of 4,5,6-trichloro-2-pyrimidylmagnesium chloride-tetrahydrofuran complex with 1 mole of ethyl acetate according to the method of Example 5 yields di(4,5,6-trichloro-2-pyrimidyl) methylcarbinol.

EXAMPLE 277.—PREPARATION OF DI(4,6-DICHLORO-2-PYRIMIDYL) METHYLCARBINOL

When 2 moles of 4,6-dichloro-2-pyrimidylmagnesium chloride-tetrahydrofuran complex react with 1 mole of ethyl acetate by the procedure of Example 6, the resulting product is di(4,6-dichloro-2-pyrimidyl) methylcarbinol.

EXAMPLE 278.—PREPARATION OF DI(1-CYCLOHEXENYL-1-) METHYLCARBINOL

Two moles of 1-cyclohexenyl-1-magnesium chloride-tetrahydrofuran complex are allowed to react with 1 mole of ethyl acetate using the procedure of Example 5. The product thus obtained is di(1-cyclohexenyl-1-) methylcarbinol.

EXAMPLE 279.—PREPARATION OF ETHYL DI(1-CYCLOHEXENYL-1-) HYDROXYACETATE

The reaction between 2 moles of 1-cyclohexenyl-1-magnesium chloride-tetrahydrofuran complex and 1 mole of diethyl oxalate according to the method of Example 6 yields ethyl di(1-cyclohexenyl-1)-hydroxyacetate.

EXAMPLE 280.—PREPARATION OF DI(4-METHYLPENTEN-1-YL-2-) METHYLCARBINOL

When 1 mole of ethyl acetate is added to 2 moles of 4-methylpenten-1-yl-2-magnesium chloride-tetrahydrofuran complex in the manner described in Example 6, there is obtained di(4-methylpenten-1-yl-2)-methylcarbinol.

EXAMPLE 281.—PREPARATION OF ETHYL DI(4-METHYLPENTEN-1-YL-2)-HYDROXYACETATE

When 2 moles of 4-methylpenten-1-yl-2-magnesium chloride-tetrahydrofuran complex react with 1 mole of ethyl oxalate by the procedure of Example 5, the resulting product is ethyl di(4-methylpenten-1-yl-2-)hydroxyacetate.

EXAMPLE 282.—PREPARATION OF DI(1-PROPENYL-2-) METHYLCARBINOL

Two moles of 1-propenyl-2-magnesium chloride-tetrahydrofuran complex are allowed to react with 1 mole of ethyl acetate using the process of Example 6. The product thus obtained is di(1-propenyl-2) methylcarbinol.

EXAMPLE 283.—PREPARATION OF ETHYL DI(1-PROPENYL-2-) HYDROXYACETATE

The reaction between 2 moles of 1-propenyl-2-magnesium chloride-tetrahydrofuran complex and 1 mole of diethyl oxalate according to the method of Example 5 yields ethyl di(1-propenyl-2-) hydroxyacetate.

EXAMPLE 284.—PREPARATION OF DI(1-PROPENYL-1-) METHYLCARBINOL

When 1 mole of ethyl acetate is added to 2 moles of 1-propenyl-1-magnesium chloride-tetrahydrofuran complex in the manner described in Example 6, there is obtained di(1-propenyl-1)-methylcarbinol.

EXAMPLE 285.—PREPARATION OF ETHYL DI(1-PROPENYL-1-)HYDROXYACETATE

When 2 moles of 1-propenyl-1-magnesium chloride-tetrahydrofuran complex react with 1 mole of diethyl oxalate by the procedure of Example 6, the resulting product is ethyl di(1-propenyl-1-)hydroxyacetate.

EXAMPLE 286.—PREPARATION OF DI(2-BUTEN-2-YL)-METHYLCARBINOL

Two moles of 2-buten-2-yl-magnesium chloride-tetrahydrofuran complex are allowed to react with 1 mole of ethyl acetate using the process of Example 6. The product thus obtained is di(2-buten-2-yl) methylcarbinol.

EXAMPLE 287.—PREPARATION OF ETHYL DI(2-BUTEN-2-YL) HYDROXYACETATE

The reaction between 2 moles of 2-buten-2-yl-magnesium chloride-tetrahydrofuran complex and 1 mole of diethyl oxalate according to the method of example 5 gives ethyl di(2-buten-2-yl) hydroxyacetate.

EXAMPLE 288.—PREPARATION OF DI(1-BUTEN-1-YL) METHYLCARBINOL

When 1 mole of ethyl acetate is added to 2 moles of 1-buten-1-yl-magnesium chloride-tetrahydrofuran complex and the method of Example 6 followed, there is obtained di(1-buten-1-yl) methylcarbinol.

EXAMPLE 289.—PREPARATION OF ETHYL DI(1-BUTEN-1-YL) HYDROXYACETATE

When 2 moles of 1-buten-1-yl-magnesium chloride-tetrahydrofuran complex react with 1 mole of diethyl oxalate by the procedure of Example 5, the resulting product is ethyl di(1-buten-1-yl)hydroxyacetate.

EXAMPLE 290.—PREPARATION OF DI(1-CHLORO-1-PROPENYL) METHYLCARBINOL

Two moles of 1-chloro-1-propenylmagnesium chloride-tetrahydrofuran complex are allowed to react with 1 mole of ethyl acetate using the process of Example 5. The product thus obtained is di(1-chloro-1-propenyl) methylcarbinol.

EXAMPLE 291.—PREPARATION OF ETHYL DI(1-CHLORO-1-PROPENYL)-HYDROXYACETATE

The reaction between 2 moles of 1-chloro-1-propenyl-magnesium chloride-tetrahydrofuran complex and 1 mole of diethyl oxalate according to the method of Example 6 gives ethyl di(1-chloro-1-propenyl) hydroxyacetate.

EXAMPLE 292.—PREPARATION OF DI(1,3-BUTADIEN-2-YL) METHYLCARBINOL

Two moles of 1,3-butadien-2-ylmagnesium chloride-tetrahydrofuran complex are allowed to react with 1 mole of ethyl acetate under the conditions of Example 5. The resulting product is di(1,3-butadien-2-yl) methylcarbinol.

EXAMPLE 293.—PREPARATION OF DI(N-METHYL-PYRRYL) METHYLCARBINOL

The reaction between 2 moles of N-methylpyrrylmagnesium chloride-tetrahydrofuran complex and 1 mole of ethyl acetate according to the procedure of Example 6 gives di(N-methylpyrryl) methylcarbinol.

EXAMPLE 294.—PREPARATION OF DI(4-VINYL-PHENYL)METHYLCARBINOL

Two moles of 4-vinylphenylmagnesium chloride-tetrahydrofuran complex are allowed to react with 1 mole of ethyl acetate under the conditions of Example 5. The product thus obtained is di(4-vinylphenyl)methylcarbinol.

EXAMPLE 295.—PREPARATION OF ETHYL DI(4-VINYLPHENYL) HYDROXYACETATE

The reaction between 2 moles of 4-vinylphenylmagnesium chloride-tetrahydrofuran complex and 1 mole of diethyl oxalate by the method of Example 6 yields ethyl di(4-vinylphenyl) hydroxyacetate.

EXAMPLE 296.—PREPARATION OF 1,1,10,10-TETRA(4-VINYLPHENYL)-1,10-DIHYDROXYDECANE

When 4 moles of 4-vinylphenylmagnesium chloride-tetrahydrofuran complex are allowed to react with 1 mole of diethyl sebacate under the conditions of Example 5, there is obtained 1,1,10,10-tetra(4-vinylphenyl)-1,10-dihydroxydecane.

EXAMPLE 297

To make the feed for the first step reaction 147 grams (1 mole) of p-dichlorobenzene was dissolved in 216 grams (3 moles) of tetrahydrofuran. 24 grams (1 gram atom) of magnesium turnings were placed in a one liter, three-necked flask, equipped with an anchor stirrer, thermometer, a burette and a reflux condenser. The air was flushed from the apparatus by a stream of nitrogen; a crystal of iodine was added and the apparatus was again purged. 2 ml. of ethyl bromide and 9 ml. of feed solution were added, and the stirrer was started. The temperature rose immediately to about 45° C. The burette was now used to make slow additions of feed to the flask. After 10 minutes about 60 ml. of feed had been added and some refluxing was taking place, the temperature being 77° C. The rest of the feed was added during the next half hour, refluxing continuing all the while and the temperature rising to about 85°. The batch was kept at reflux for another 1½ hours and then was cooled in an ice bath to about 12° C. Then was begun the addition of 44 gms. (0.5 mol) of ethyl acetate diluted with about 40 ml. of tetrahydrofuran. The total batch was added in 15 minutes, the temperature being held at about 30–40° by the ice bath. After the addition the batch was held at about 30° C. for a half hour to complete the reaction and then it was chilled. A solution of 20 ml. of sulfuric acid in 250 ml. of water was added slowly (15 minutes).

The batch now separated into two layers. It was dumped into a 3 liter beaker. The excess acid was neutralized with sodium bicarbonate. The upper, organic layer was separated out and filtered. The aqueous layer was extracted with tetrahydrofuran and the extract, after filtration, was added to the original organic layer filtrate. The combined filtrates were now stripped under vacuum to remove tetrahydrofuran and any ethyl alcohol which had been formed, leaving 125 grams of crude α,α-bis(p-chlorophenyl) ethanol. Analysis indicated that this was over 90% pure. The yield was about 90%.

EXAMPLE 301.—BIS-p-CHLOROPHENYL PERFLUORO-PROPYLCARBINOL

Two moles of p-chlorophenylmagnesium chloride is added to a solution of one mole of ethyl perfluorobutyrate in 200 ml. of tetrahydropyran at reflux as fast as the system will allow. The mix is heated at reflux for 2 to 3 hours longer—cooled and treated with an acid solution (400 ml. of water and 200 ml. of concentrated hydrochloric acid). The layers are separated and the organic layer is stripped of solvent, finishing at 20 mm. pressure and a temperature of 80° C., to yield bis-p-chlorophenyl perfluoropropylcarbinol.

EXAMPLE 302.—BIS-p-CHLOROPHENYL PERFLUORO-NONYLCARBINOL

By the process of Example 301, ethyl perfluorocaprate in a solution of 2-methoxytetrahydropyran yields bis-p-chlorophenyl perfluorononylcarbinol.

EXAMPLE 303.—BIS-p-CHLOROPHENYL TRICHLORO-METHYLCARBINOL

By the process of Example 301, ethyl trichloro-acetate in a solution of 2-ethoxy tetrahydropyran yields bis-p-chlorophenyl trichloromethylcarbinol.

EXAMPLE 304.—OCTYL p,p'-DICHLOROBENZILATE

By the process of Example 301, dioctyl oxalate in a solution of dihydropyran yields octyl p,p'-dichlorobenzilate.

EXAMPLE 305.—OCTYL p,p'-DICHLOROBENZILATE

By the process of Example 301, dioctyl oxalate in a solution of tetrahydrofurfuryl ethyl ether yields octyl p,p'-dichlorobenzilate.

EXAMPLE 306.—ETHYL DICHLOROBENZILATE

Five moles of p-chlorophenyl magnesium chloride is slowly added to a flask containing 2.5 moles of ethyl oxalate in 15 moles of tetrahydrofuran. The reaction was initiated and held between 10° and 20° C. during the addition. After completion of the addition, the mixture was allowed to stand for 3 hours, cooled, treated with sulfuric acid, the layers separated, and the organic layer stripped of solvent by vacuum distillation, to yield ethyl dichlorobenzilate.

EXAMPLE 307.—DI(p-CHLOROPHENYL) TRIFLUORO-METHYLCARBINOL

Ethyl trifluoroacetate (53.7 grams) is slowly added to a flask containing about 500 ml of p-chlorophenyl magnesium chloride in tetrahydrofuran, with constant agitation. The mixture was heated to reflux for 1 hour after completion of the ester addition, hydrolyzed by ice and sulfuric acid, the layers separated, and the solvent distilled at 2 mm. pressure and 160° C., to yield di(p-chlorophenyl) trifluoromethylcarbinol.

The aldehydes prepared by the process described are useful as perfume and flavor ingredients and as chemical intermediates as also are the acetals and ketals. Some of these compounds are prepared with great difficulty in other ways.

Those compounds containing ethylenic unsaturated groups, as for instance, vinyl groups, are useful as polymerization or copolymerization monomers and as cross-linking aids. Some also have fungistatic and fungicidal properties. One in particular, ViCOCH$_2$COVi, polymerizes to form a resin possessing unique metal chelating properties.

Those compounds containing the dialkylaminophenyl groups are useful as dye intermediates.

Many of the tertiary alcohols possess inseciticidal properties, especially the chlorine and fluorine derivatives.

Many are useful as stabilizers to prevent ultra-violet light degradation of polyvinyl chloride resins.

Those acids derived from two moles of RMgCl and polyesters are useful as plasticizer intermediates.

While the invention has been described with particular reference to specific embodiments, it is to be understood that it is not limited thereto but is to be construed broadly and restricted solely by the scope of the appended claims.

Throughout the application it is specified that the reactive compound is RMgCl·nQ. This is so in the equations illustrative of the process and of the materials used in the examples. It is necessary that the RMgCl compounds be formed in the presence of compound Q. However, the process of the present invention is not dependent upon RMgCl being present in the form of the Q complex (RMgCl·nQ). The illustrative equations herein may also be written with RMgCl in place of RMgCl·nQ and could read with RMgCl as an alternative reactant to RMgCl·nQ.

The processes of this application can be used to produce, economically, chemicals which are already articles of commerce, such as anisaldehyde, α,α-bis-(chlorophenyl) ethanol, vinyl ketones and many others.

They also provide means for introducing unusual substituents into known compounds. These substituents alter profoundly the physical, and sometimes the chemical properties of the compounds, greatly increasing their field of usefulness. Many of the compounds so formed are entirely new, while others, although known, never reached commercial acceptance because previous methods of manufacture were too expensive.

The versatility of the processes makes it possible to "tailor make" chemicals for specific applications, especially when aryl, heterocyclic or vnivl groups are needed.

What is claimed is:

1. A process comprising reacting an acid derivative selected from the class consisting of ethyl malonate, ethyl succinate, ethyl phthalate, methyl formate, ethyl acetate, butyl laurate, methyl oleate, diethyl oxalate, dibutyl succinate, dimethyl adipate, dimethyl sebacate, diethyl maleate, diethyl terephthalate, methyl benzoate, methyl anisate, methyl furoate, methyl nicotinate, butyl 2,4-dichlorophenoxyacetate, methyl levulinate, monoethyl succinate, diethyl sebacate, ethyl perfluorobutyrate, ethyl perfluorocaprate, ethyl trichloroacetate, dioctyl oxalate, ethyl trifluoroacetate, butyl acetate, methyl acrylate, acetyl chloride, butyryl chloride, benzoyl chloride, oxalyl chloride, adipoyl dichloride, furoyl chloride, acetonitrile, butyronitrile, benzonitrile, acrylonitrile and fumaronitrile, with an organomagnesium chloride in the presence of compound Q; said organomagnesium chloride being prepared by reacting an organic chloride of the formula RCl wherein R is selected from the class consisting of aryl, vinyl and aromatic-heterocyclic radicals, with magnesium in compound Q; wherein said compound Q is selected from the class consisting of tetrahydrofuran, tetrahydropyran, 2-ethoxy-tetrahydropyran, dihydropyran, tetrahydro furfuryl ethyl ether and 2-methyl tetrahydrofuran; wherein said aromatic-heterocyclic radical is selected from the class consisting of 2-thienyl, 2-pyridyl, α-furyl, 5-chloro - 2-thienyl, 2 - benzothiazolyl, 2 - benzoxazolyl, 2-methyl-5-benzothiazolyl, 2-quinolyl, 6-quinolyl, 8-quinolyl, 6-chloro-2-methoxy-9-acridyl, 4-chloro-6-pyrimidyl, 4,5,6-trichloro - 2 - pyrimidyl, 4,6-dichloro-2-pyrimidyl and N-methylpyrryl.

2. The process according to claim 1 in which R is the vinyl radical.

3. The process according to claim 1 in which R is the p-vinylphenyl radical.

4. The process according to claim 1 in which R is the anisyl radical.

5. The process according to claim 1 in which R is an aryl radical.

6. The process according to claim 1 in which Q is tetrahydrofuran.

References Cited in the file of this patent

OTHER REFERENCES

Feiser et al.: "Org. Chem.," Reinhold Publ. Co., 1950, pp. 135–151.

Kharasch: "Grignard Reactions of Non-Metallic Substances" (1954), pp. 549–846.

Helvetica Chimica Acta, vol. 26 (1943), pp. 2251–52.